(12) United States Patent
Peterson et al.

(10) Patent No.: US 10,486,341 B2
(45) Date of Patent: Nov. 26, 2019

(54) LOW DELAMINATION MOLD RELEASE

(71) Applicant: PETERSON CHEMICAL TECHNOLOGY LLC, West Lake Hills, TX (US)

(72) Inventors: Kyle W. Peterson, West Lake Hills, TX (US); Bruce W. Peterson, Fort Smith, AR (US); Mark L. Crawford, Rudy, AR (US)

(73) Assignee: L & P PROPERTY MANAGEMENT COMPANY, South Gate, CA (US)

( * ) Notice: Subject to any disclaimer, the term of this patent is extended or adjusted under 35 U.S.C. 154(b) by 0 days.

(21) Appl. No.: 16/028,181

(22) Filed: Jul. 5, 2018

(65) Prior Publication Data
US 2018/0311865 A1    Nov. 1, 2018

Related U.S. Application Data

(62) Division of application No. 15/066,326, filed on Mar. 10, 2016, now Pat. No. 10,040,223.

(60) Provisional application No. 62/130,802, filed on Mar. 10, 2015.

(51) Int. Cl.
| | | |
|---|---|---|
| *B29C 33/62* | (2006.01) | |
| *C08G 18/22* | (2006.01) | |
| *B29C 33/58* | (2006.01) | |
| *C08G 18/16* | (2006.01) | |
| *C08G 18/42* | (2006.01) | |
| *C08G 18/48* | (2006.01) | |
| *B29K 75/00* | (2006.01) | |
| *B29K 105/04* | (2006.01) | |
| *B29K 105/00* | (2006.01) | |
| *C08G 101/00* | (2006.01) | |
| *B29L 31/58* | (2006.01) | |
| *B29L 31/00* | (2006.01) | |
| *B29C 44/02* | (2006.01) | |

(52) U.S. Cl.
CPC .............. *B29C 33/62* (2013.01); *B29C 33/58* (2013.01); *C08G 18/16* (2013.01); *C08G 18/168* (2013.01); *C08G 18/22* (2013.01); *C08G 18/42* (2013.01); *C08G 18/48* (2013.01); *B29C 44/02* (2013.01); *B29K 2075/00* (2013.01); *B29K 2105/0014* (2013.01); *B29K 2105/04* (2013.01); *B29K 2105/045* (2013.01); *B29K 2105/046* (2013.01); *B29K 2995/0002* (2013.01); *B29K 2995/0069* (2013.01); *B29L 2031/58* (2013.01); *B29L 2031/751* (2013.01); *C08G 2101/00* (2013.01); *C08G 2101/0008* (2013.01); *C08G 2101/0016* (2013.01); *C08G 2101/0025* (2013.01); *C08G 2350/00* (2013.01); *C08J 2375/04* (2013.01)

(58) Field of Classification Search
CPC ......... B29C 33/58; B29C 33/62; B29C 44/02; B29K 2075/00; B29K 2105/0014; B29K 2105/04; B29K 2105/045; B29K 2105/046; B29K 2995/0002; B29K 2995/0069; B29L 2031/58; B29L 2031/751; C08G 18/16; C08G 18/168; C08G 18/22; C08G 18/42; C08G 18/48; C08G 2101/00; C08G 2101/0008; C08G 2101/0016; C08G 2101/0025; C08G 2350/00; C08J 2375/04
See application file for complete search history.

(56) References Cited

U.S. PATENT DOCUMENTS

| | | | |
|---|---|---|---|
| 4,038,088 A | 7/1977 | White et al. | |
| 4,882,107 A * | 11/1989 | Cavender | B05D 1/025 264/51 |
| 5,278,247 A | 1/1994 | Miyazono et al. | |
| 5,500,176 A * | 3/1996 | Parks | B29C 33/62 264/257 |
| 5,529,739 A * | 6/1996 | Jonsson | B29C 33/60 264/300 |
| 5,993,528 A | 11/1999 | MacKey | |
| 6,841,115 B2 | 1/2005 | Six et al. | |
| 7,195,726 B1 | 3/2007 | Niswander | |
| 2007/0283844 A1 | 12/2007 | Henning | |

FOREIGN PATENT DOCUMENTS

| | | |
|---|---|---|
| CN | 1200748 | 4/2001 |
| CN | 101802044 A | 8/2010 |
| EP | 2197647 A2 | 6/2010 |

(Continued)

OTHER PUBLICATIONS

EP Application No. 16762495.6—Extended Search Report dated Jan. 18, 2019.

(Continued)

*Primary Examiner* — John M Cooney
(74) *Attorney, Agent, or Firm* — Mossman, Kumar & Tyler, PC

(57) ABSTRACT

Methods and combinations of a curing catalyst with a mold release mixture, which is then subsequently applied to the surface of a mold prior to the application of polyurethane reactants to said mold, where the curing catalyst component has the effect of catalyzing the reaction at the surface of the molded part. This catalysis results in greater reactivity at the surface between reacting portions and lower delamination of the surface of the foam, thereby leading to more attractive skins with a more consistent cell structure, and lower de-mold times due to skins whose nature makes them less likely to adhere to the surface of the mold. These foams will be less likely to tear upon opening of the mold, and production quality and output will be improved.

20 Claims, 8 Drawing Sheets

(56) References Cited

FOREIGN PATENT DOCUMENTS

| JP | 2004034463 A | 2/2004 |
|---|---|---|
| WO | 8601215 A1 | 2/1986 |
| WO | WO 86/01215 A1 | 2/1986 |

OTHER PUBLICATIONS

EP Application No. 16762495.6—Extended Search Report dated Jan. 19, 2019.
Chineze application No. CN201680022230.5—Office Action dated Apr. 11, 2019.

\* cited by examiner

Types of Micelle

Spherical Micelle    Rod-shape Micelle    Lamellar Micelle

LOW DELAMINATION MOLD RELEASE

CROSS-REFERENCE TO RELATED APPLICATION

This application is a divisional application of U.S. patent application Ser. No. 15/066,326 filed Mar. 10, 2016 that issued Aug. 7, 2018 as U.S. Pat. No. 10,040,223, which in turn claimed the benefit of U.S. Provisional Patent Application No. 62/130,802 filed Mar. 10, 2015, both of which are incorporated herein by reference in their entireties.

TECHNICAL FIELD

The invention relates to compositions and methods for making and using a mold release mixture comprised of a barrier release coating and a curing catalyst to improve surface cure and reduce de-molding time of molded foams such as polyether polyurethane foams and polyester polyurethane flexible foams as non-limiting examples.

TECHNICAL BACKGROUND

Flexible polyurethane foam is commonly produced by methods of molding and free-rise. The process of molding polyurethane flexible foam involves introducing chemicals required for making foam, such as one or more polyols, one or more isocyanates and one or more additives, in the desired ratio by injection or open pour into an individual, multiple or continuous mold and allowing the reacting foam system to fill the mold(s).

Molded flexible polyurethane foam articles such as pillows, automotive seating, or head rests are made in various molds that have a mold release applied to the inside surfaces of the mold prior to injecting or pouring foam-forming chemicals into the mold. The mold release mixtures are typically sprayed to promote even coverage. However, there are other methods of application such as wiping, pouring, and any other method which deposits a thin film or a film thick enough to provide the desired mold release properties on a surface.

A mold can be defined as a hollow form or matrix that gives a particular shape to an article in a molten or plastic state. It can be constructed from a metallic or nonmetallic material and its shape can be simple or complex, depending on the nature of the molded part. Before the mold is used, it may be necessary to pretreat the mold surface, thereby improving the adhesion of the mold release mixture. This can be accomplished through various means such as sandblasting or disc sanding, sand paper polishing, degreasing, or electropolishing.

Conventional mold release compositions comprise materials such as waxes or silicones, which are dissolved or dispersed in a solvent carrier, which may be organic solvent-based, petroleum-based or water-based. Petroleum-based mold release compositions usually have a problem with imparting an odor to the foam surface. In order to remove petroleum or solvent odors from a molded foam part, it needs to be exposed to sufficient airflow to allow the odorous solvent(s) to volatilize or diffuse away from the foam surface prior to packaging. Water-based mold release compositions typically do not have the odor problems that solvent-based mold release compositions have.

Molded foams may have a problem with skin delamination, wherein the skin splits from the main body of the foam, if the mold is opened before the skin has sufficiently cured. In order to reduce skin delamination, the foamed part may have to stay in the mold for a longer time and at a higher temperature to crosslink or cure the skin. Improving skin quality can increase de-molding time, thus reducing production output.

It is helpful and desirable to develop new, alternative and/or improved mold release mixtures to improve surface cure, create higher skin porosity, prevent skin delamination, and reduce de-molding times for the facilitation of higher production rates on mold lines.

SUMMARY

There is provided, in one non-limiting embodiment, a combination of a barrier release coating and a curing catalyst, with the possible optional addition of a surfactant or combination of surfactants and a suspending solvent solution, to produce a mold release mixture, where the mold release mixture prevents adherence of polyurethane reactants to a mold surface that was coated prior to addition of polyurethane reactants to the mold.

In a different non-restrictive version there is provided a method of applying a mold release mixture to a mold that includes initially coating the mold with a first mold release mixture comprising a concentration of between about 0.1 to about 100% by weight of barrier release coating, followed by the application of a second mold release mixture comprising a concentration of between about 0.1 to about 98% by weight of curing catalyst.

In another non-limiting embodiment there is provided a method of producing polyurethane articles that includes coating the surface of a mold with a mold release mixture comprising a barrier release coating and a curing catalyst, drying the mold release mixture on the mold surface, introducing polyurethane reactants to the mold, removing a polyurethane article from the mold, and recoating the mold surface with mold release mixture.

There is provided, in one non-limiting embodiment, a mold release mixture comprised of a curing catalyst in a concentration of between 0.1-98% by weight suspended in a solvent with the optional addition of a surfactant, where the curing catalyst mixture is selected from the group consisting of tertiary amines; amides; carbamide; a metal catalyst comprising soaps, alcoholates or salts of metals having the formula:

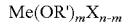

where Me is a metal having an atomic number in the range of 21 to 83, R' is selected from the group consisting of aliphatic, cycloaliphatic, and aryl hydrocarbon radicals containing at least six carbon atoms, n is the valence of the metal Me and is at least 3, X is an organic carboxylic acid radical and m is a positive integer selected from the range of 0 to the valence of the metal Me, such that the metal catalyst catalyzes the chemical reaction between polyisocyanate and polyurethane with accompanying foaming of said composition; and combinations thereof; which curing catalyst is suspended in a solvent selected from the group consisting of water, an organic solvent with a boiling point less than or equal to 500° C., and mixtures thereof.

Additionally there is provided a method of producing polyurethane articles that includes coating the surface of a mold with a mold release mixture comprising 0% to 99.9% by weight of a barrier release coating which can be a polar, semi-polar, or non-polar solvent, and 0% to 99.9% by weight of a curing catalyst, drying the mold release mixture on the mold surface, until 0% to 100% of the optional solvent has been removed, optionally applying a subsequent mold release mixture comprising a barrier release coating, 0% to 99.9% by weight of a polar, semi-polar, or non-polar solvent, and 0% to 99.9% by weight of the curing catalyst, on top of this layer, drying this subsequent layer until 0% to 100% of the optional solvent has been removed, optionally repeating this application and drying process for any number of mold release mixtures, each comprising a barrier release coating, 0% to 99.9% by weight of a polar, semi-polar, or non-polar solvent, and 0% to 99.9% by weight of the curing catalyst, introducing polyurethane reactants to the mold, and removing a polyurethane article from the mold.

Figure 1:
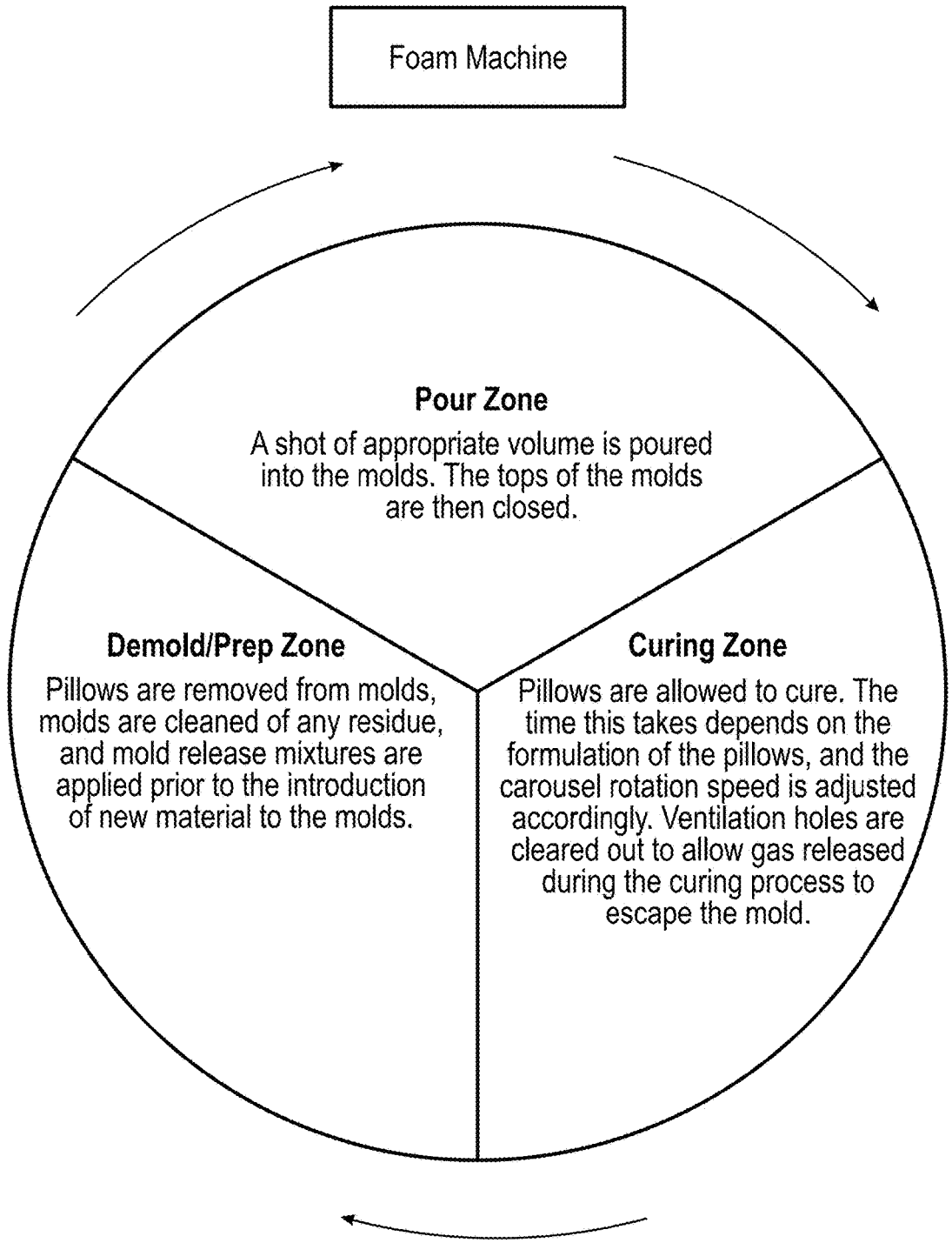
FIG. 1 is a schematic illustration of the major steps of a continuous molding line.
Figure 4:
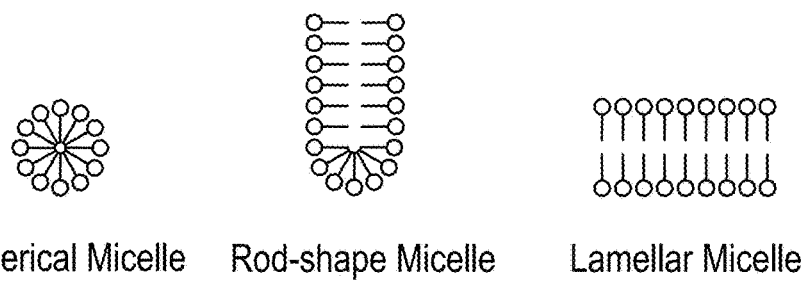
FIG. 4 is a schematic depiction of some arrangements of micelles that may occur within an emulsified mixture.
Figure 5:
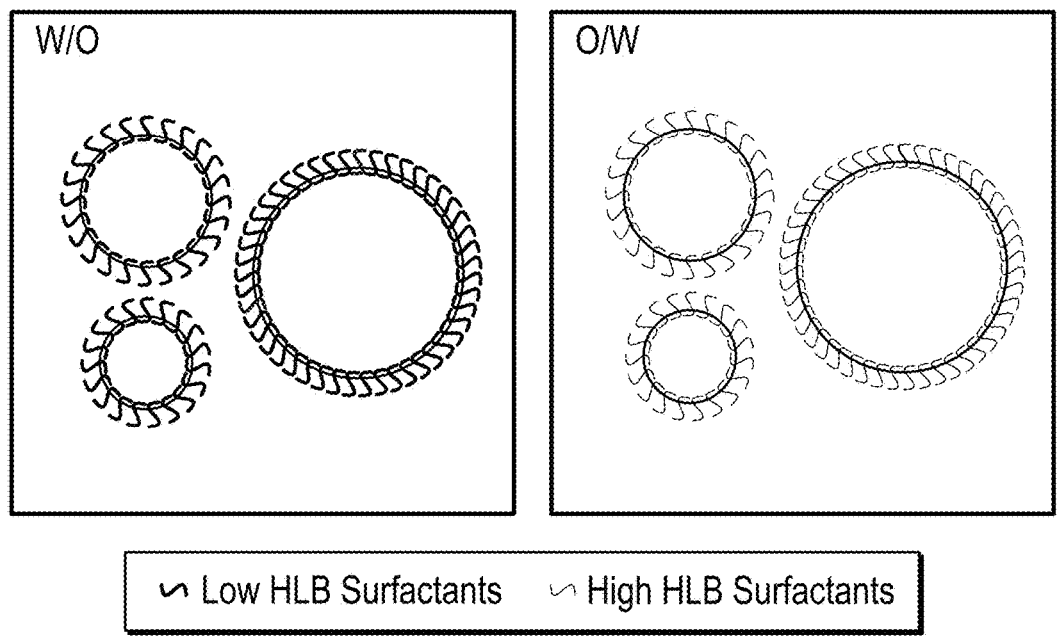
FIG. 5 is a schematic depiction of spherical micelles of different HLB values in different types of emulsifications.

It will be appreciated that FIGS. 1, 4, and 5 are schematic and that many details have been removed or simplified for clarity, and thus the invention is not necessarily limited to the embodiments depicted in these Figures.

DETAILED DESCRIPTION

It has been discovered that producing and using a mold release mixture comprised of a barrier release coating and a curing catalyst improves surface curing, increases skin porosity, reduces skin delamination on the mold surface, and/or reduces de-molding time of molded polyurethane foams when the mold release mixture is applied to the mold prior to addition of any polyurethane foam reactants.

Molded polyurethane foams are comprised of opened-cell, partially opened-cell, or closed-cell polyurethane foams such as polyether polyurethane foams and polyester polyurethane flexible foams. Molded polyurethane foams may be flexible, semi-rigid, or rigid polyurethane foams.

Polyurethane foam reactants are mixed together usually with a high shear mixer or high shear mix head, and poured in a mold. After adding the required weight of polyurethane reactants, the mold is closed and the foam is allowed to react and expand. The skin curing rate is affected by the temperature of the mold. Cooler mold temperatures tend to reduce the blowing efficiency of the foam reactants and reduce the volume of the foam cells, thereby increasing the skin foam density. Alternatively, higher mold temperatures can reduce the skin density.

The barrier release coating portion of the mold release mixture is comprised of film-forming lubricating oils, solid lubricants, waxes, other lipids, silicones or fluids whose purpose is the prevention of sticking or adherence to the surface upon which they are coated by any polyurethane foam reactants. Barrier release coatings may be in the range of about 0.1 independently to about 99.9% by weight in the mold release mixture, alternatively from about 50 independently to about 98 wt %, before application to the mold surface and may occur in a non-limiting embodiment as liquids, semisolids, or solids at ambient room temperature. It should be understood that the use of the term "independently" in conjunction with a range means that any lower threshold may be joined with any upper threshold to form an acceptable alternate range.

The barrier release coating has an electrical nature of polar, semi-polar, or non-polar at a pH of between about 0 independently to about 14; when measured at standard temperature and pressure (STP), defined here as a temperature of 273.15 K and an absolute pressure of 1 bar. As a result, the behavior of the barrier release coating may be, but is not necessarily, defined as hydrophilic, hydrophobic, lipophilic, lipophobic and combinations thereof.

General categories of lipids include, but are not limited to, waxes, oils, and fats. Each of these can be subdivided by the source from which they are derived, with the generalized sources being organic and mineral origins, the former of which can be further subdivided into animal and plant origins. In general, fats and oils are predominantly, but not necessarily, triesters (triglycerides, triacylglycerols or TAGs) of glycerol and aliphatic fatty acids containing up to 22 carbon atoms, differing in large part by the level of unsaturation of their fatty acids, a property directly related to their melting point. Waxes are esters of long-chain fatty acids, usually, but not necessarily, containing between 24 and 28 carbons atoms, with long-chain primary alcohols comprising between 16 and 36 carbon atoms or with alcohols of the steroid group.

Fatty acids are defined as carboxylic acids consisting of a hydrocarbon chain and a terminal carboxyl group, especially any of those occurring as esters in fats and oils. The fatty acids that comprise lipids can be subdivided by their level of saturation, thought of generally as the relative number of single bonds to double bonds occurring between adjacent carbon atoms, where a higher relative level of single bonds means the fatty acid is more saturated. The level of saturation can be determined either qualitatively or quantitatively by one of a few known methods. Qualitative analysis of a compound can be done via either the bromine test, where the sample is treated with elemental bromine, or Baeyer's reagent, comprised of a strong oxidant, potassium permanganate. In both cases, the unknown sample is treated with the appropriate reagent and reaction with double or triple bonds leads to a change in color whose hue and saturation give a qualitative notion of that compound's level of unsaturation. Quantitative analysis can be determined either by analyzing the nature and structure of the compound via NMR spectroscopy and/or IR, or more commonly via determination of the Iodine Value (IV). Defined as the mass of iodine in grams that is consumed by 100 grams of a chemical substance, this value is based on the tendency of double bonds to react with iodine compounds, and as such, the higher the iodine number, the higher the presence of double bonded carbons, and thus the higher the level of unsaturation. For a fatty acid, IV is determined by AOCS Method Tg 1a-64, and for fats and oils, it is found with AOCS Method Cd 1-25.

Saturated fatty acids can be chosen from a list that includes, but are not limited to, propionic, butyric, valeric, isovaleric, caproic, caprylic, capric, lauric, myristic, palmitic, stearic, tuberculostearic, arachidic, behenic, lignoceric, cerotic, montanic, and melisic acid. Unsaturated fatty acids can be chosen from a list that includes, but is not limited to, caproleic, stillingic, lauroleic, myristoleic, palmitoleic, hiragonic, elaidic, oleic, petroselinic, vaccenic, linoleic, (gamma) linolenic, eleostearic, (alpha) linolenic, gadoleic, eicosatrienoic, dihomo-Y linolenic, EPA, erucic, DPA, and DHA acid. Those not easily categorized into either classification can be chosen from a list that includes, but is not limited to, chaulmogric, malvalic, ricinoleic, vernolic, sterculic, arachidonic, and lesquerolic acid.

Fats and oils are primarily differentiated by the physical state of the material at ambient temperature, such that oils are generally, but not necessarily, liquid at ambient temperatures, and fats are generally, but not necessarily, semi-solid mixtures of crystals in oil at the same temperature. Frequently, fats are derived from animal origins while oils are derived from plant origins, but this is not necessarily the case. Those oils and fats which are commonly used in industry include, but are not limited to, castor oil, Chinese tallow, crambe oil, crepsis foetida oil, croton oil, jojoba oil, lesquerella seed oil, linseed oil, meadowfoam oil, neatsfoot oil, oitica oil, and castor oil.

Waxes are generally defined as fatty acid esters of alcohols and are formed by reaction of an alcohol and a fatty acid to produce a wax ester and water, as shown with the following general reaction:

$$CH_3(CH_2)_nCH_2OH + CH_3(CH_2)_nCOOH \rightarrow CH_3(CH_2)_nCH_2COOCH_2(CH_2)CH_3 + H_2O$$

Naturally occurring waxes can be classified as organic waxes and mineral waxes. Those organic waxes derived from animals include, but are not limited to: beeswax, Chinese wax, shellac, spermaceti, and wool (anhydrous lanolin) wax. Those derived from vegetables include, but are not limited to, bayberry, carnauba, esparto, Japan wax, jojoba, ouricury, and sugarcane wax. Those mineral waxes derived from petroleum include, but are not limited to, microcrystalline, comprising hydrocarbons with molecular weights of between 490 and 800, and paraffin, comprising hydrocarbons with molecular weights of between 350 and 420. Other waxes derived from minerals include, but are not limited to, montan, comprised of tricontanyl esters of acids containing between 28 and 30 carbons. Another class of waxes, known as polyalphaolefins, are synthetic straight chain and branched paraffins, specifically those classified as alpha-olefins, defined as olefins or alkenes with a chemical formula $C_xH_{2x}$, such that the double bond occurs at the primary or alpha position (between the first and the second carbon of the chain). Alpha-olefins can be further subdivided into branched and linear based upon the specific arrangement of the carbon molecules. The molecular weight of these synthetic molecules, as well as the degree to which they are branched, could potentially be adjusted to target a specific melting point desired for a certain application.

Another non-limiting classification of lipids is terpenes, defined as condensation products of isoprene, or 2-methyl-1,3 butadiene. These may be linear or cyclic, include major essential oils, fat-soluble colors, fat-soluble vitamins, and steroids, and are further subdivided by the number of isoprene units as monoterpenes (two units), sesquiterpenes (three units), diterpenes (four units), triterpenes (six units), tetraterpenes (eight units), and polyterpenes (more than eight units). From these, it is possible to synthesize many sterols, which include, but are not limited to isoprene, bixin, geraniol, β-carotene, limonene, zeaxanthin, squalene, lycopene, cholesterol, stigmasterol, $\alpha_1$-sitosterol, β-sitosterol, and campesterol.

Silicones are defined generally as synthetic compounds or polymers that contain silicon. Also referred to as polymerized siloxanes or polysiloxanes, these are defined as mixed inorganic-organic polymers with the general formula:

$$[R_2SiO]_n$$

where R is an organic group such as methyl, ethyl, or phenyl.

There may be other suitable components than those listed herein, and as such, any other lipids or fluids commonly used in barrier release coatings in the industry or otherwise suitable to coat the surface of a solid mold such that the adherence of the polyurethane foam reactants is inhibited should be considered as well.

Emulsifiers may be used to stabilize the barrier release coating in the carrier solvent; that is to be in a stable emulsion with each other so that they do not separate upon standing. Emulsifiers may be categorized as cationic, anionic, nonionic, or amphoteric. Emulsifiers may include, but are not limited to, fatty acids with carbon lengths of 8 to 22, fatty acid carboxylates with sodium, calcium, zinc, magnesium, and other metal ions. Some examples of emulsifiers include, but are not limited to, acetophenone, dimer acids, isostearic acids, linoleic acids, oleic acids, ricinoleic acid, cetyl alcohol, decyl alcohol, hexadecyl alcohol, isodecyl alcohol, isohexadecyl alcohol, lauryl alcohol, oleyl alcohol, stearyl alcohol, tridecyl alcohol, arachidyl propionate, ARLAMOL™ E, beeswax, benzene, bensonitrile, bromobenzene, ceresine wax, chlorinated paraffin, chlorobenzene, cocoa butter, corn oil, cottonseed oil, cyclohexane, decahydro naphthalene, decyl acetate, diethyl aniline, diisoctyl phthalate, diisopropyl adipate, diisopropyl benzene, dimethyl silicone, ethyl aniline, ethyl benzoate, fenchone, glycerol monostearate, hydrogenated peanut oil, isopropyl myristate, isopropyl lanolate, isopropyl palmitate, jojoba oil, kerosene, anhydrous lanolin, liquid lanolin, lard, lauryl amine, menhaden oil, methyl phenyl silicone, methyl silicone, naphthenic mineral oil, paraffinic mineral oil, mineral spirits, mink oil, nitrobenzene, N,N-diethyl-m-toluamide, nonyl phenol, orthodichlorobenzene, palm oil, paraffin wax, petrolatum, petroleum naphtha, pine oil, polyethylene wax, cetyl ether polyoxypropylene 30, propene tetramer, rapeseed oil, silicone oil, soybean oil, styrene, toluene, trichlorotrifluoroethane, tricresyl phosphate, and xylene. The emulsifier is added to reduce settling or separation of the mold release in the carrier solvent during long term storage.

One or more curing catalysts is added in the range of about 0.01 independently to about 98% by weight of the catalyst in the mold release mixture, alternatively from about 1 independently to about 80 wt %, before application to the mold surface. In one non-limiting embodiment, the curing catalyst in the mold release mixture is adjusted in a range to get the required demold time and surface cure depending on the mold composition, surface roughness, surface temperature and polyurethane reactant exotherm and chemistry. Prior to mixing in the mold release mixture, curing catalysts may be in liquid or solid form, having melting points less than about 300° F. (about 150° C.) at 760 mm Hg. Curing catalysts may comprise of nitrogen-containing compounds such as, but not limited to, tertiary amines, amides, carbamide (urea), cyclohexyldimethylamine; 2-dimethylaminoethanol; 4-ethylmorpholine; N, N,4-trimethylpiperazine-1-ethylamine; 1,4-dimethylpiperazine; 3-aminopropyldimethylamine; 2,2'-iminodiethanol, 1-methylimidazole; 1,2-dimethylimidazole; 2-[[2-(dimethylamino)ethyl]methylamino]ethanol; N-[3-(dimethylamino)propyl]-N, N',N'-trimethylpropane-1,3-diamine; 1,1'-[[3-(dimethylamino)propyl]imino]bispropan-2-ol; (2-[[2-(dimethylamino)ethoxy]ethyl)methylamino]ethanol; benzyldimethylamine; 4-methylmorpholine, N,N,N',N'-tetramethylhexamethylenediamine; 2-[2-(dimethylamino)ethoxy]ethanol; 1,4-diazabicyclooctane; bis(2-dimethylaminoethyl)(methyl)amine, N,N,N',N'-tetramethyl-2,2'-oxybis(ethyl)amine; 2,2'-dimorpholinyldiethylether; 1,8-diazabicyclo[5.4.0]undec-7-ene; N'-[3-(dimethylamino)propyl]-N, N-dimethylpropane-1,3-diamine; N,N,N',N',N',N'-hexamethyl-1,3,5-triazine-1,3,5(2H,4H,6H)-tripropanamine; N, Nbis(3-(dimethylamino)propyl]-N',N'-dimethylpropane-1,3-diamine, triethylamines; and combinations thereof; or soaps, alcoholates or salts of metals having the formula:

where Me is a metal having an atomic number in the range of 21 to 83, R' is selected from the group consisting of aliphatic, cycloaliphatic, and aryl hydrocarbon radicals containing at least six carbon atoms, n is the valence of the metal Me selected and is at least 3, X is an organic carboxylic acid radical and m is a positive integer selected from the range of 0 to the valence of the metal Me, such that this compound catalyzes the chemical reaction between polyisocyanate and polyester with accompanying foaming of said composition.

In the context in which they have been referred, an amine can be defined as an ammonia molecule with one or more aliphatic and/or aromatic organic groups attached. They have the general formulas of either $NH_2R$, $NHR_2$, or $NR_3$. More specifically, these amines can be referred to as primary amines, secondary amines, and tertiary amines, respectively. An amide is a variation on this wherein a carbonyl group lies between the nitrogen and one of the R groups, which may more generally be defined as any organic compound containing the group —C(O)NH$_2$. In both cases, the R group can be defined as being selected from a group consisting of bonded molecules, at least one of which is carbon and serves as the bonding site for other attached groups in the overall compound. In the case of an amide, the definition of an R group may be extended to comprise a hydrogen atom by itself. In one non-limiting embodiment, the R group contains from 0 independently to 100 carbon atoms; alternatively, from 1 independently to 25 carbon atoms. It should be noted the R group does not necessarily represent the same group across various instances of, or even within the same, amines, such that, for example, $NR_3$ may equally be represented as N bonded to R, R', and R", where all three groups may be distinct from one another. Nor, for example, should the R group in the general formula $NH_2R$ necessarily be taken to represent the same group as any of those in $NHR_2$ or $NR_3$. "Other attached groups" are defined herein as any group containing atoms other than nitrogen, carbon, or hydrogen but which may additionally include nitrogen, carbon, and/or hydrogen; alternatively, as any group containing atoms defined as non-metals on the Periodic Table, which includes, but is not necessarily limited to, phosphorus, oxygen, sulfur, selenium, fluorine, chlorine, bromine, and iodine, and combinations thereof, possibly, but not necessarily, in addition to any combination of carbon, hydrogen, and/or nitrogen. Suitable examples of other attached groups include, but are not necessarily limited to, $CH_2OCH_2CH_2N(CH_3)_2$, $C_6H_5$, and $CH_2O(CH_2)_2NCH_3(CH_2)_2OH$ in the cases of bis-(2-dimethylaminoethyl)ether (ZF22), benzyldimethylamine (BDMA), and N,N,N'-trimethyl-N'-hydroxyethylbisaminoethylether (ZF-10), respectively.

Barrier release coatings and curing catalysts and optional emulsifiers may be dispersed in a solvent carrier comprising water; but also volatile organic solvents having a boiling point of less than about 392° F. (about 200° C.) at 760 mmHg such as, but not limited to acetonitrile, acrylonitrile, 3-chloropropene (allyl chloride), benzene, benzyl chloride, bromodichloromethane, bromoethane (ethyl bromide), bromoform, bromomethane, 1,3-butadiene, n-butane, chlorobenzene, chloroethane, chloroform, chloromethane, carbon disulfide, carbon tetrachloride, 2-chlorotoluene, cyclohexane, dibromochloromethane, 1,2-dibromoethane, 1,2-dichlorobenzene, 1,3-dichlorobenzene, 1,4-dichlorobenzene, FREON® 12 (dichlorodifluoromethane), 1,1-dichloroethane, 1,2-dichloroethane, 1,1-dichloroethene, 1,2-dichloroethene (cis), 1,2-dichloroethene (trans), 1,2-dichloropropane, 1,3-dichloropropene (cis), 1,3-dichloropropene (trans), FREON®114 (1,2-dichlorotetrafluoroethane), 1,4-dioxane, ethyl acetate, ethanol, ethylbenzene, 4-ethyltoluene, n-heptane, hexachloro-1,3-butadiene, n-hexane, isopropyl alcohol (2-propanol), isopropylbenzene (cumene), methylene chloride, 2-hexanone (MBK), 2-butanone (MEK), 4-methyl-2-pentanone (MIBK), methyl methacrylate, methyl-tertbutyl ether (MTBE), naphthalene, propylene, styrene, tertiary butyl alcohol (TBA), 1,1,2,2-tetrachloroethane, tetrachloroethene, tetrahydrofuran, toluene, 1,2,4-trichlorobenzene, 1,1,1-trichloroethane, 1,1,2-trichloroethane, trichloroethene, FREON®11 (trichlorofluoromethane), FREON113 (1,1,2-trichloro-1,1,2-trifluoroethane), 1,2,4-trimethyl benzene, 1,3,5-trimethylbenzene, 2,2,4-trimethylpentane (isooctane), vinyl acetate, bromoethene (vinyl bromide), vinyl chloride, xylene (para and meta), xylene (ortho), xylene(mixed isomers), and combinations thereof. Alternatively, the organic solvent may be a semi-volatile solvent, comprising a boiling point between about 200° C. to about 500° C. at 760 mmHg such as, but not limited to methylated siloxanes.

Alternatively, the barrier release coating and curing catalyst may be mixed to form a solid or liquid at room temperature (about 25° C.) such as a paste or high viscosity liquid to wipe on the mold surface. As used in this instance, a paste can be defined as a substance that behaves as a solid until a load or stress is applied with a force greater than or equal to the sheer threshold of the solid, at which point it flows like a fluid. In another non-limiting embodiment, a paste is a semi-solid substance at ambient temperature (about 20 to 22° C. or 68 to 72° F.).

Solvent carriers and optional emulsifiers are chosen based on their ability to solvate the barrier release coating, curing catalyst. The emulsifier package is chosen based on its Hydrophile-Lipophile properties (HLB) for solubilizing the barrier release coating and curing catalyst in the carrier agent.

The Hydrophile-Lipophile Balance (HLB) is the balance of the size and strength of the hydrophilic and lipophilic groups of an emulsifier, representing the tendency of an emulsifier to solubilize in water and oil, respectively. An emulsifier or emulsifier system is capable of facilitating the solvation of some or all of the components of the mold release mixture into an emulsion, defined as a fine dispersion of minute droplets of one liquid into another, into which it is not soluble or miscible. If the exact nature of the components of a blend is known, this value can be calculated for each component using the following equation:

$$HLB = \frac{MH}{M} \times 20$$

where MH is the molecular mass of the hydrophilic portion of the molecule and M is the molecular mass of the whole molecule. If such a calculation is not possible or is impractical, the HLB of a system can be determined experimentally via invert emulsion experiments, gas-liquid chromatography, or nuclear magnetic resonance spectroscopy. Frequently, emulsifiers represent a blend, where the resultant HLB of the system is calculated as the weighted average of the HLBs of the individual components. For a water and oil system, the required HLB can be calculated experimentally, and the relative values of the HLB of the emulsifier system will determine the type and thickness of solution desired in the final product. For example, an emulsifier system with an excessively low HLB can be used as a thickener. In the case of mold release, which is applied through a spray, the solution should be of a fairly low viscosity, so the HLB of the emulsification system should be targeted to be at least as hydrophilic as the required HLB of the system ($HLB_{emulsification} \leq HLB_{required}$). Once the appropriate HLB for the system has been determined, it is important to find an emulsification system with the ideal chemical type for ideal emulsification. This, too, can be determined experimentally. The emulsifier blend can be adjusted to suit this requirement while tuning the HLB. The percentage of each emulsifier required to have a blend of emulsifiers A and B with the desired HLB, X, can be calculated with the following equations:

$$\% A = \frac{100 \times (X - HLB_B)}{HLB_A - HLB_B}$$

$$\% B = 100 - \% A$$

Ideally, these mixtures should contain an emulsifier with lipophilic tendencies and another with hydrophilic tendencies, as these blends are the most stable. The HLB value is a number falling between 0 and 20, generally broken down such that those emulsifiers with HLBs between 4-6 are water in oil (W/O) emulsifiers, characterized as emulsifiers that are preferentially oil-soluble, those with HLBs between 7-9 are wetting agents, defined as a chemical that can be added to a liquid to reduce its surface tension and make it more effective in spreading over and penetrating surfaces, those with HLBs between 8-18 are oil in water (O/W) emulsifiers, characterized as emulsifiers that are preferentially water-soluble, those with HLBs between 13-15 are detergents, defined as substances that are oil-soluble and capable of holding insoluble foreign matter in suspension, and those with HLBs between 10-18 are solubilizers, defined as agents that increase the solubility of a substance.

When surfactants are used in a solution, the point known as the critical micelle concentration (CMC) is the concentration of surfactant past which all additional surfactant will interact with itself to form micelles. By definition, surfactants are molecules that contain a region that is lipophilic (the "tail", containing an abundance of carbon and hydrogen and is attractive to oils) and another that is hydrophilic (the "head", which is generally polar and is attractive to water). When the CMC is reached, these molecules interact with one another, aligning their corresponding lipophilic and hydrophilic portions with those of adjacent surfactants to produce a structure that can have a variety of shapes, the most common of which is a sphere where the hydrophilic heads reside on the outside and the lipophilic tails are collected on the inside (see FIGS. 4 and 5). Known as a micelle, these surfactants no longer contribute to surface tension or aid in the emulsion of insoluble components of a mixture. The value of this CMC is affected by the presence of various salts, ions, and other components, and was a factor that was carefully considered in the selection of the emulsifier and determination of the optimal mixture for the mold release solutions addressed in the composition and methods described herein. The surface tension of polyurethane foams has a strong relationship with both the cellular structure of the foam and the skin of the final molded product.

The propensity of a liquid to wet and spread over a solid surface rather than retracting from the surface and beading is based on both the surface tension of the liquid and the surface energy, or wetting tension, of the solid surface. The wetting tension of a surface can be measured according to ASTM D 2578-04, which involves the preparation and application of a series of mixtures of formamide and ethyl CELLOSOLVE™ of gradually increasing surface tensions onto the solid surface in question until a mixture is found that just wets the surface. Should the wetting tension be greater than or equal to the liquid surface tension, the liquid will readily wet, whereas a lower wetting tension would lead to the breaking of the liquid into droplets.

The remaining presence of a high level of solvent coating the surface of the mold would allow the mold release to flow, leading to an inconsistent coating on the surface of the mold. The remaining presence of these solvents can also serve to interact with the polyurethane foam, acting as a blowing agent, defined here as a substance which is capable reacting with isocyanate and producing a $CO_2$ gas (acting as an auxiliary blowing agent for aqueous-based solvents) or decreasing density, thereby softening the surface of the polyurethane foam. It is therefore desirable for this solvent to vaporize quickly from the surface of the mold, leaving behind those components that are active in curing polyurethane skins and facilitating their release from the mold.

The temperature of the mold is an important consideration in the selection of the boiling point of the solvent carrier, which can be adjusted with the addition of various salts and other components in the system. The ebulliometry, or boiling point elevation of the solvent, is the change in the temperature at which the solvent vaporizes due to the presence of solute in the overall solution. This can be calculated with the following equation:

$$\Delta T_b = K_b \times b_B$$

where $K_b$ is the ebullioscopic constant of the solvent and $b_B$ is the molality of the solution, calculated as the molality of the solvent times the van't Hoff factor, a constant number that represents the number of individual particles formed by the compound in solution. $K_b$ can be calculated with the following equation:

$$K_b = RT_b^2 \frac{M}{\Delta H}$$

where here R is the gas constant, $T_b$ is the boiling temperature of the pure solvent, M is the molar mass of the solvent, and $\Delta H$ is the heat of vaporization per mole of the solvent.

The mold temperatures typically used in molded systems fall in the non-limiting range of about 32° F. to about 400° F. (about 0° C. to about 204° C.). When high amounts of blowing agents such as acetone are used in the formulation of the polyurethane foam, the vaporization of these agents will lead to a reduction of the mold temperature that must be offset by having the mold set to a higher temperature, but the net resultant temperature should still fall within this range.

Following the addition of the mold release solution to the surface of the solid mold, it may be desirable for much of the solvent to be vaporized before the polyurethane reactants are introduced to the surface of the solid mold. This can be achieved by any method comprising some combination of the addition of heat to or the reduction of atmospheric pressure of the mold release solution sufficient to achieve the boiling point of the mold release solution over a period of time such that the resulting layer of mold release solution remaining on the surface of the molded part contains a sufficiently low concentration of solvent to allow for the optimal functioning of the active components of the mold release solution, namely the barrier release coating and the curing catalyst, to allow for optimal behavior in aiding the surface curing of the molded part and the release of the final molded part from the solid mold.

One non-limiting method of application of a mold release solution onto a solid mold is via spraying, achieved by preparing a solution with a sufficiently low viscosity and supplying the mold release solution via a pump, pressure pot, gravity feed or other suitable means to evenly apply the mold release liquid over the surface of the solid mold. The spray may be supplied via hydraulic pressure or additional air atomization.

Another non-limiting method of application of a mold release solution onto a solid mold is via wiping, or the mechanical addition via rubbing or other suitable mechanical shear forces of a liquid or a paste onto the surface of a solid by use of an intermediate carrier material such as a cloth, polyurethane foam, or any other suitable material that will contain a sufficient volume of the material until enough force is applied to disperse the material at a metered rate over a given surface area of a solid. In the case of a wax, the carrier can be more broadly defined as any material on which the wax is deposited that is then used to redeposit the wax onto a solid surface, as the retention of the wax is dictated through the internal adherence of that wax to the surrounding waxy material.

Another non-limiting method of application of a mold release mixture onto a solid mold is via dipping, wherein the mold itself is submerged in a liquid solution of mold release mixture, allowing the adherence of mold release mixture onto the solid surface of the mold, and removed, whereupon exposure to air and any suitable means of vaporizing the liquid solvent portion of the mold release mixture discussed herein can dry the mold release mixture, leaving behind the desired layer of mold release mixture on the surface of the mold.

There may be may other methods of coating a solid mold with a mold release mixture, and as such, any suitable means of transferring the mold release mixture as either a liquid or a wax onto the surface of a solid mold not discussed herein should be considered a further extension of the scope of this discussion.

There can also be some variability in the order in which the components may be added to the surface of the mold, the net result of which could be a variable concentration gradient of the two components of the mold release system. One non-limiting embodiment of spray order involves first spraying an initial coating of the barrier release coating by itself to form a base layer. In one non-limiting embodiment the top surface of this barrier release coating is dry before the next coat is applied. This is then followed by the application of a solution containing a mixture with some amount of barrier release coating of a concentration of between about 0.1 to about 98 wt % and curing catalyst at a concentration of between about 1 to about 98 wt %, which can optionally be reapplied separately for each iteration of usage without the need to reapply the initial, base layer until such a time as its concentration has been depleted.

One non-limiting embodiment of spray order involves first spraying an initial coating of the barrier release coating by itself to form a base layer. In another non-restrictive version the top surface of this barrier release coating is dry before the next coat is applied. This is then followed by the application of a solution of a curing catalyst at a concentration of between about 0.1 to about 98 wt %, optionally suspended in solvent, which can optionally be reapplied separately for each iteration of usage without the need to reapply the initial, base layer until such a time as its concentration has been depleted.

Mold Release Preparation

Mold release mixtures may be prepared through the combination of all components in the system in some order whereby the final product contains any and all components in their appropriate concentrations. One non-limiting method of preparation would be the metered addition of all components via pumps or pouring into a mixing vessel. Other suitable methods include, but are not limited to, premixing of various combinations of components which are then added to one another, the simultaneous or sequential addition of all components into a single system, or the addition of single components to a system of mixed components until all components have been added to a single system.

The mold release mixtures may be mixed at a temperature between about −10° F. to about 400° F. (about −23° C. to about 204° C.) and at a pressure from full vacuum to 20 atm (2 MPa).

Mold release mixtures comprise a system of solid and liquid components in a solution, and as such may be prepared using any method suitable for mixing a solid/liquid solution, including some combination of, but not limited to the application of energy through direct application heat and/or pressure applied to the solution or through the agitation of the solution by either mechanical agitation, including but not limited to shaking and stirring with an impeller that can generally be classified as either open, semi-open, or closed/shrouded and directs flow either axially for the purposes of homogenization through bulk motion or radially for the imposition of shear stress to otherwise immiscible liquids and whose shape can be classified as either a propeller, a paddle, high-shear impeller, a turbine, jet agitation, or in-line emulsification pump using any of the above impeller types to move the solution through some enclosure such as a tube, whereby it is returned to the initial mixing vessel through some type of nozzle, all followed by or comprising a sufficient length of time and energy to allow the full dissolution of all components of the mold release system into solution.

Applications of the Mold Release

Mixture and Polyurethane Foams

The list below shows some, but not all, of the applicable uses of the molded polyurethane foams produced using the mold release mixture outlined herein.
1. Pillows and other bed-top products;
2. General furnishings and upholstered furniture including cushions, armrests, seat-backs, foot-rests, decorative cushioning and functional support structures.
3. Rebond carpet pad or use as a floor mat (rebond carpet pad uses recycled foam to create the pad that goes under carpet, giving a cushioned feel and extra life to the carpet);
4. Use as a shoe insert foamed in-situ with energy absorption foam, viscoelastic foam or other foam;
5. Use in medical applications such as wheelchair seat cushions and backs, orthopedic shoes, hospital beds, gurney pads, medical bed pads, medical supports and cushioning;
6. Use in protective packaging to form foam parts shaped to follow the contours of the item being shipped.
7. Use in conventional polyether polyurethane foams, high resilient polyether polyurethane foams, viscoelastic polyether polyurethane foams, semi-rigid polyether polyurethane foams, rigid polyether polyurethane foams, polyester polyurethane foams, combined polyether-polyester foam or latex foam for general cushioning, energy absorption, packaging, sealants and fillers; and
8. Seat cushions, seat backs, headrests and armrests of chairs and seats for application in vehicles such as automobiles, motorcycles, bicycles, buses, aircraft, watercraft, tractors and other agricultural equipment such as combines, construction equipment and utility vehicles.

The list below shows some, but not all, of the applicable uses of the molded elastomers produced using the mold release mixture outlined herein.
1. Three-dimensional objects or depictions such as children's toys designed for the purpose of entertainment and/or education.
2. Specific three-dimensional parts designed with the primary purpose of functionality for use in manufacturing or industry.
3. Small elastomeric components of larger commercial products wherein a specific shape is required to perform some function.

The list below shows some, but not all, of the applicable uses of molded rigid foam produced using the mold release mixture outlined herein.
1. Panels or other physical arrangements and components for use as insulation in such applications as buildings, trucks, rail cars, shipping containers, tanks, pipelines, cold-storage warehouses, frozen food displays, and any other suitable application wherein the regulation of heat transfer between two physically separated environments is desired.
2. Boating applications and components, wherein the high buoyancy of rigid foam is desired, such as in the cores of surfboards, rigid-hulled boats, inflatable boats, or any other arrangement wherein a solid object may need assistance in increasing buoyancy.
3. Any application wherein the transmittance and accumulation of water may be undesired, wherein a rigid insulation foam may provide a barrier for such, as in the case of boat decks, outdoor marine surface areas, or other surfaces and liquid barrier components that may be exposed to water.
4. Applications wherein it is desired to deaden the transmission of sound waves between two areas and sound deadening components generally.
5. Flooring, simulated wood, or other applications and components where rigid support and strength are required but a softer surface than may be provided by other materials is desired.

The methods and compositions will now be described more specifically with respect to particular formulations, methods and compositions herein to further illustrate the invention, but which examples are not intended to limit the methods and compositions herein in any way.

FIG. 1 shows a schematic illustration of a continuous molding line. The circle depicted is a carousel that spins at a predefined rate based on the rise and demold time of the molded parts.

Figure 2:
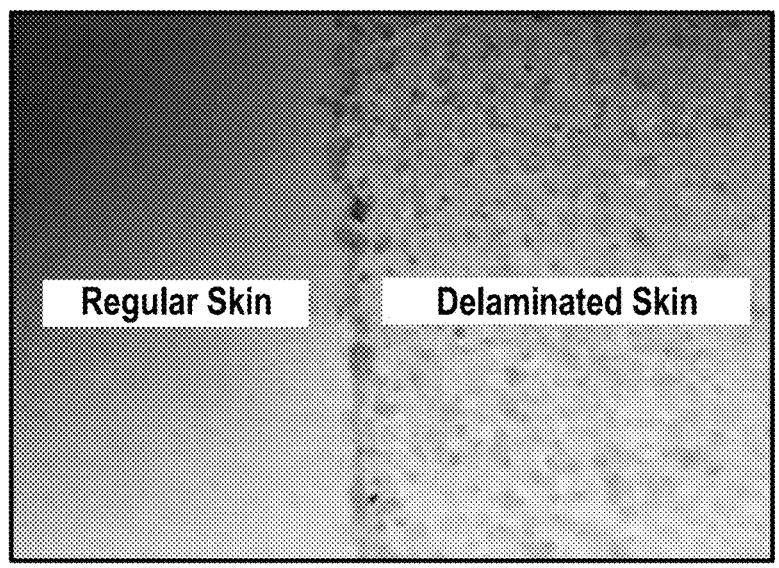
FIG. 2 is a photograph of a foam pillow with skin partially delaminated contrasted with normal skin appearance.

FIG. 2 shows an open-cell polyurethane foam with skin partially delaminated as contrasted with the appearance of normal foam skin.

Figure 3:
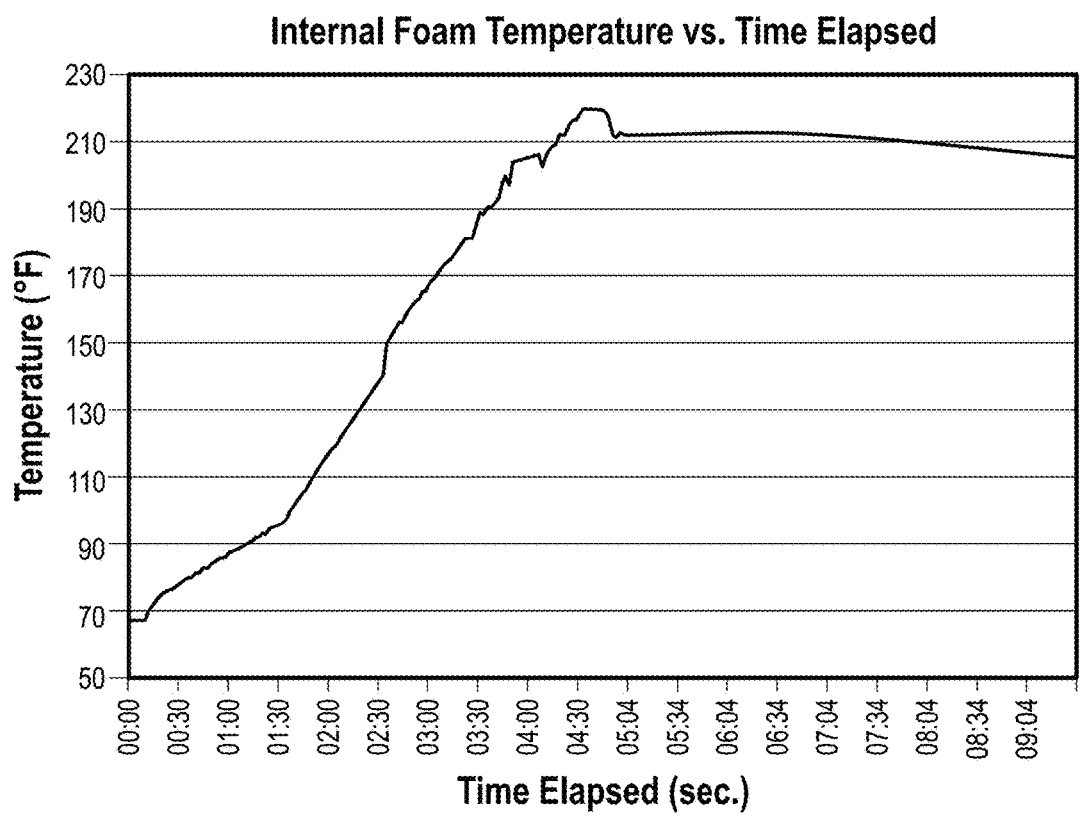
FIG. 3 depicts a plot of curing characteristics of a polyurethane foam plotting internal foam temperature as a function of time elapsed.

FIG. 3 shows a plot of typical curing characteristics of a polyurethane foam expressed temperature as a function of time.

FIG. 4 schematically shows some possible micelle arrangements, and FIG. 5 schematically shows spherical micelles in different types of emulsions.

Example 1

This experiment was run to determine the efficacy of the ideas and concepts contained herein. More specifically, a comparison was made between two release coatings, both containing the same base mold release mixture, with one, the mold release mixture, containing 20% by weight of a carbamide and 80% by weight of the water-based release coating PC-80 (sold by Peterson Chemical Technology), and the other, the standard release coating (control) comprised entirely of the water-based release coating PC-80, with no additional components. For consistency, the same pillow system, divided into an A (active) and B side (sold as MS-4000X by Peterson Chemical Technology), was used for both. The foams were poured into a form such that the bottom of the pillows was in contact with an aluminum plate with dimensions 12"×12" (30.5 cm×30.5 cm). This plate was placed in direct contact with a silicone heater with thermocouple so that the temperature of the plate could be regulated. Material was sprayed onto the plate with an air atomized spray gun at three different levels of loading for each temperature and each release coating and the results were recorded. These results are summarized in Table 1. TABLE 1 depicts the data gathered through the course of the experiment described in Example 1, which were used in producing the graphs depicted in FIGS. 6-11.

TABLE 1

| Mold | | | | | | | | | Foam Properties | | | | | | | | | | | |
|---|---|---|---|---|---|---|---|---|---|---|---|---|---|---|---|---|---|---|---|---|
| Release Mixture | | | Plate Temp. | | Weight (g) | | | | Airflow | | | | | Skin Airflow Loss (vs.) | | | | Density | | |
| Mixture | Temp. | Sample ID | Before Spray | @ 3 minutes | Material Sprayed | Residue Collected | Skin (uncrushed) | Skin (crushed) | Bottom | Middle | Top | Average | Bottom | Middle | Top | Average | Skin (½") | Core | Δ | % Difference |
| Mold Release Mixture | 135 | 1 | 135.2 | 132.4 | 1.2 | 0.3 | 2.22 | 2.87 | 9.63 | 9.92 | 9.43 | 9.66 | 6.76 | 7.05 | 6.56 | 6.79 | 2.95 | 2.54 | 0.41 | 16.14% |
| | | 2 | 135.0 | 132.3 | 1.0 | 0.3 | 2.98 | 3.09 | 9.54 | 9.80 | 9.20 | 9.51 | 6.45 | 6.71 | 6.11 | 6.42 | 3.03 | 2.63 | 0.40 | 15.21% |
| | | 3 | 135.2 | 131.9 | 0.1 | 1.2 | 4.34 | 5.00 | 9.46 | 9.80 | 9.23 | 9.50 | 4.46 | 4.80 | 4.23 | 4.50 | 2.88 | 2.61 | 0.27 | 10.34% |
| | | Average 1-3 | 135.1 | 132.2 | 0.8 | 0.6 | 3.18 | 3.65 | 9.54 | 9.84 | 9.29 | 9.56 | 5.89 | 6.19 | 5.63 | 5.90 | 2.95 | 2.59 | 0.36 | 13.90% |
| | 155 | 4 | 156.0 | 148.9 | 0.8 | 0.1 | 3.56 | 3.91 | 11.06 | 10.96 | 10.48 | 10.83 | 7.15 | 7.05 | 6.57 | 6.92 | 2.82 | 2.45 | 0.37 | 15.10% |
| | | 5 | 154.7 | 149.9 | 0.3 | 0.3 | 5.51 | 6.69 | 11.13 | 10.96 | 9.80 | 10.63 | 4.44 | 4.27 | 3.11 | 3.94 | 2.69 | 2.36 | 0.33 | 13.98% |
| | | 6 | 156.1 | 149.3 | 0.4 | 0.7 | 3.36 | 4.07 | 10.23 | 10.72 | 9.86 | 10.27 | 6.16 | 6.65 | 5.79 | 6.20 | 2.73 | 2.44 | 0.29 | 11.89% |
| | | Average 4-6 | 155.6 | 149.4 | 0.5 | 0.4 | 4.14 | 4.89 | 10.81 | 10.88 | 10.05 | 10.58 | 5.92 | 5.99 | 5.16 | 5.69 | 2.75 | 2.42 | 0.33 | 13.66% |
| | 175 | 7 | 175.6 | 165.1 | 0.8 | 0.3 | 3.35 | 3.65 | 10.22 | 10.21 | 9.35 | 9.93 | 6.57 | 6.56 | 5.70 | 6.28 | 2.70 | 2.49 | 0.21 | 8.43% |
| | | 8 | 175.2 | 166.1 | 0.9 | 0.2 | 3.66 | 3.70 | 8.15 | 8.33 | 7.87 | 8.12 | 4.45 | 4.63 | 4.17 | 4.42 | 2.70 | 2.47 | 0.23 | 9.31% |
| | | 9 | 174.8 | 169.1 | 0.5 | 0.3 | 3.77 | 4.07 | 8.75 | 8.70 | 8.50 | 8.65 | 4.68 | 4.63 | 4.43 | 4.58 | 3.14 | 2.77 | 0.37 | 13.36% |
| | | Average 7-9 | 175.2 | 166.8 | 0.7 | 0.3 | 3.59 | 3.81 | 9.04 | 9.08 | 8.57 | 8.90 | 5.23 | 5.27 | 4.77 | 5.09 | 2.85 | 2.58 | 0.27 | 10.37% |
| Standard Release Coating | 135 | 10 | 136.9 | 132.4 | 0.9 | 2.3 | 2.86 | 7.70 | 9.95 | 9.77 | 8.98 | 9.57 | 2.25 | 2.07 | 1.28 | 1.87 | 2.79 | 2.55 | 0.24 | 9.41% |
| | | 11 | 136.3 | 131.2 | 1.6 | 2.1 | 1.79 | 6.72 | 8.50 | 8.67 | 8.15 | 8.44 | 1.78 | 1.95 | 1.43 | 1.72 | 3.18 | 2.65 | 0.53 | 20.00% |
| | | 12 | 136.2 | 131.7 | 0.8 | 2.3 | 3.24 | 7.97 | 9.52 | 9.75 | 9.05 | 9.44 | 1.55 | 1.78 | 1.08 | 1.47 | 2.86 | 2.53 | 0.33 | 13.04% |
| | | Average 10-12 | 136.5 | 131.8 | 1.1 | 2.2 | 2.63 | 7.46 | 9.32 | 9.40 | 8.73 | 9.15 | 1.86 | 1.93 | 1.26 | 1.69 | 2.94 | 2.58 | 0.37 | 14.15% |
| | 155 | 13 | 154.2 | 150.0 | 1.7 | 0.6 | 2.11 | 3.02 | 9.83 | 9.97 | 9.22 | 9.67 | 6.81 | 6.95 | 6.20 | 6.65 | 2.66 | 2.54 | 0.12 | 4.72% |
| | | 14 | 156.0 | 149.0 | 2.4 | 0.2 | 2.11 | 4.30 | 10.05 | 10.48 | 10.18 | 10.24 | 5.75 | 6.18 | 5.88 | 5.94 | 2.83 | 2.47 | 0.36 | 14.57% |
| | | 15 | 154.5 | 148.0 | 3.4 | 0.5 | 2.67 | 4.70 | 10.05 | 9.79 | 9.76 | 9.87 | 5.35 | 5.09 | 5.06 | 5.17 | 2.84 | 2.50 | 0.34 | 13.60% |
| | | Average 13-15 | 154.9 | 149.0 | 2.5 | 0.4 | 2.30 | 4.01 | 9.98 | 10.08 | 9.72 | 9.93 | 5.97 | 6.07 | 5.71 | 5.92 | 2.78 | 2.50 | 0.27 | 10.97% |
| | 175 | 16 | 174.2 | 164.4 | 1.5 | | 3.83 | 5.77 | 8.69 | 8.75 | 8.50 | 8.65 | 2.92 | 2.98 | 2.73 | 2.88 | 2.87 | 2.74 | 0.13 | 4.74% |
| | | 17 | 174.3 | 165.8 | 1.3 | 0.3 | 2.79 | 4.70 | 9.28 | 9.36 | 8.60 | 9.08 | 4.58 | 4.66 | 3.90 | 4.38 | 3.12 | 2.79 | 0.33 | 11.83% |
| | | 18 | 175.7 | 165.6 | 0.8 | 0.3 | 2.94 | 3.98 | 9.52 | 9.60 | 8.84 | 9.32 | 5.54 | 5.62 | 4.86 | 5.34 | 2.92 | 2.60 | 0.32 | 12.31% |
| | | Average 16-18 | 174.4 | 165.3 | 1.2 | 0.2 | 3.19 | 4.82 | 9.16 | 9.24 | 8.65 | 9.02 | 4.35 | 4.42 | 3.83 | 4.20 | 2.97 | 2.71 | 0.26 | 9.63% |

The steps of the experiment were as follows:
1) Place the plate on the silicone heater with thermocouple and bring it to the correct temperature. For this experiment, the temperatures used were 135° F. (57° C.), 155° F. (68° C.), and 175° F. (97° C.).
2) Mix the B side together in a cup and set aside.
3) Record the weight of the spray pot with air pressure, supporting the hose so as not to skew the results. Spray the plate with the appropriate level of loading of mold release (low, medium, or high) and reweigh the spray pot, noting the difference as the quantity of material sprayed.
4) Place the box form (12"×12" (30.5 cm×30.5 cm) internally with no top or bottom) for the foam on the pillow mold, lined on the inside with a small, 4 gallon (18 liter) trash bag. Start a countdown timer for 4 minutes.
5) After 3 minutes, record the temperature on the surface of the plate using a temperature probe.
6) After another 30 seconds (3 minutes 30 seconds elapsed), begin mixing together the A and B side. Continue mixing for the remaining 30 seconds.
7) Pour the foam onto the plate and allow to rise for 3 minutes.
8) Remove the foam from the plate by firmly gripping two adjacent corners and pealing back the foam over the course of about 3 seconds.
9) Collect with a scraper and record the weight of the residue left behind on the surface of the plate.
10) Repeat the above steps for all loading levels and temperatures with each release coating, cleaning the aluminum plate thoroughly with water between tests.

After this experiment was completed, the bottom/2 inch (6.35 mm) of the foams were cut off as the skin, followed by 1 inch (2.54 cm) from the bottom, middle, and top of the foams. The density was measured and the airflow recorded using the AMSCOR Model 1377 Foam Porosity Instrument for each of these layers. The results of this experiment are shown and analyzed in FIGS. 6-11 and Table 1.

Example 2

Figure 10:
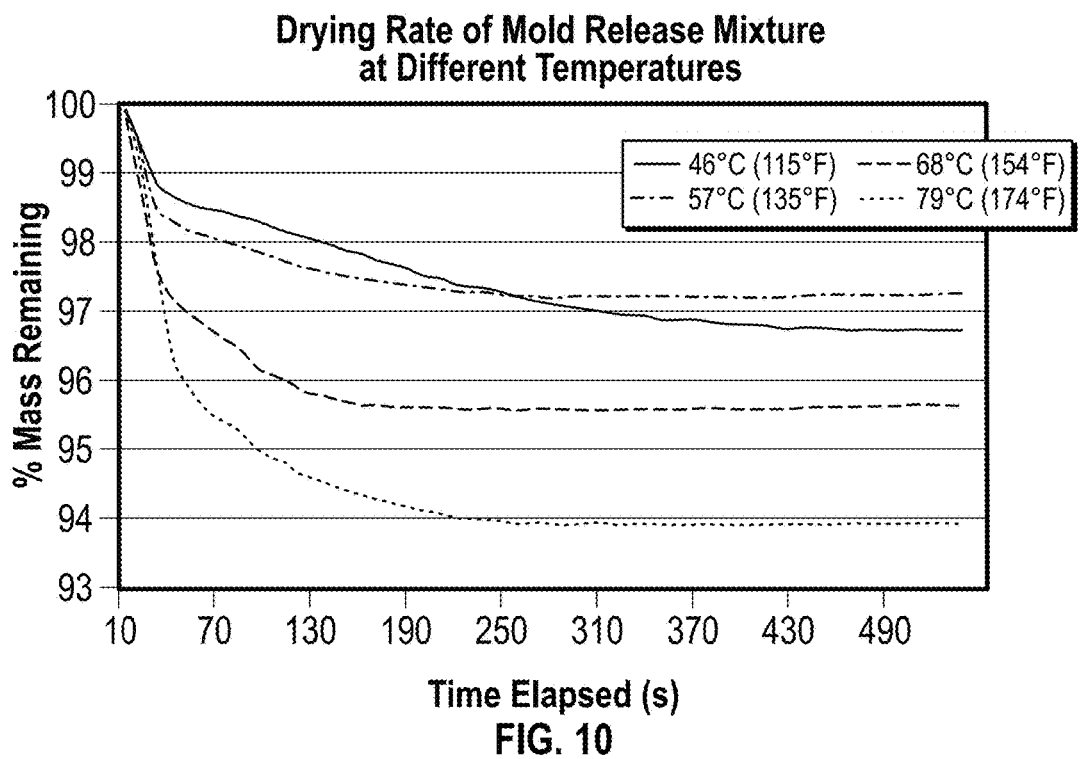
FIG. 10 is a chart depicting the drying rate of the PC-80 mold release mixture with 20% by weight curing catalyst, measuring % mass remaining as a function of time elapsed via the experiment described in Example 2.
Figure 11:
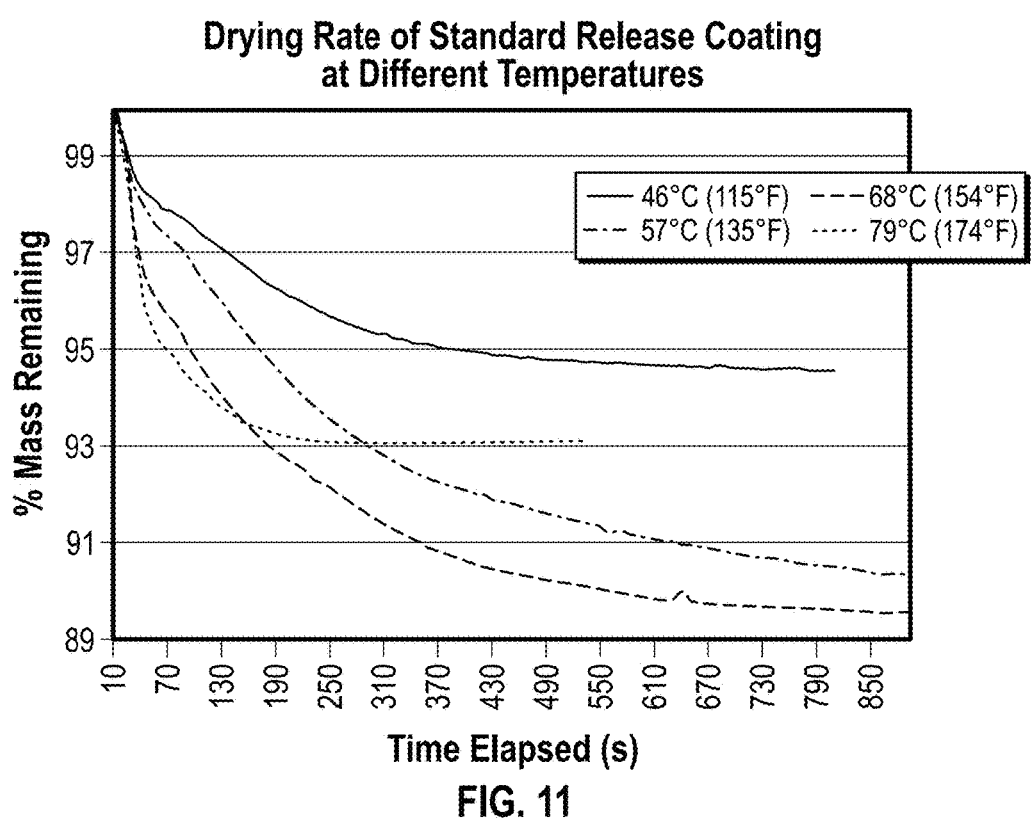
FIG. 11 is a chart depicting the drying rate of the PC-80 standard release coating via the experiment described in Example 2.

This experiment was run to determine the rate of evaporation of volatiles from both the plain release coating (RC) and the release coating with 20% catalyst (RC-20) using a heated analytical scale with programmed parameters. Each release coating was sprayed onto a sample plate and placed in the shielded chamber on the surface of the scale. This plate was zeroed and a program was run which held the temperature of the chamber at one of four different values (115° F. (46° C.), 135° F. (57° C.), 155° F. (68° C.), and 175° F. (97° C.)) for up to ten minutes, or until the results had stabilized (whichever occurred first). Weights changes were recorded periodically and graphed to show an evaporation profile of each release coating. This was used to determine the best interval of time to wait after spraying the release coatings onto the plate in Example 1 before the foam was introduced to the plate, which was found to be 3 minutes. The results of this experiment are shown in FIGS. 10 and 11.

Example 3

This experiment was run to compare several mold release mixtures compared by mixing the release coating PC-80 with several different amine catalysts at different levels. The catalysts used for this were ZF-10, ZF-22, A-33, and carbamide, each at levels of 2% by weight and 20% by weight, with the remaining weight percent comprising the PC-80 release coating. Additionally, a control of the standard release coating, comprising 100% of the PC-80 release coating (sold by Peterson Chemical Technology) was used. For consistency, the same pillow system, divided into an A (active) and B side (sold as MS-4000X by Peterson Chemical Technology), was used for both. The foams were poured into a form such that the bottom of the foams was in contact with an aluminum plate with dimensions of 10"×10" (25.4 cm×25.4 cm). This plate was placed in direct contact with a silicone heater with a thermocouple so that the temperature of the plate could be regulated to 135° F. (57.2° C.). Material was sprayed onto the plate with an air atomized spray gun, and 0.8 g of each mold release mixture was sprayed on to the plate and allowed to dry for four minutes prior to pouring the foam onto the plate. After the cured foam was removed, various tests were run, and the results of these tests, along with other data collected during the experiment were gathered and are described in Example 2, which is used in producing the graphs depicted in FIGS. 12-15.

TABLE 2

| Mold Release Mixture | PC-80 % w/w | Curing Catalyst ID | Curing Catalyst % w/w | # | Weights (g) Amount Sprayed | Weights (g) Residue Collected | Notes |
|---|---|---|---|---|---|---|---|
| RC | 100% | | 0% | 1 | 3.1 | 2.16 | NO skin on foam |
| | | | | 2 | 2.07 | 0.58 | |
| | | | | Av. | 2.585 | 1.37 | |
| RC1 | 98% | ZF-10 | 2% | 1 | 2.6 | 1.93 | Was difficult to remove from plate, No skin on foam |
| | | | | 2 | 1.56 | 0.18 | |
| | | | | Av. | 2.08 | 1.055 | |
| RC2 | 98% | A-1 | 2% | 1 | 2.31 | 0.78 | |
| | | | | 2 | 1.95 | 0.37 | |
| | | | | Av. | 2.13 | 0.575 | |
| RC3 | 98% | A-33 | 2% | 1 | 2.17 | 0.41 | Residue was tacky |
| | | | | 2 | 1.64 | 0.3 | |
| | | | | Av. | 1.905 | 0.355 | |
| RC4 | 98% | Carbamide | 2% | 1 | 4.07 | 0.29 | |
| | | | | 2 | 0.85 | 0.14 | Residue seemed to be tackier than before, but it also had a higher loading |
| | | | | Av. | 2.46 | 0.215 | |

TABLE 2-continued

| Mold Release Mixture | PC-80 % w/w | Curing Catalyst ID | Curing Catalyst % w/w | # | Weights (g) Amount Sprayed | Weights (g) Residue Collected | Notes |
|---|---|---|---|---|---|---|---|
| RC5 | 80% | ZF-10 | 20% | 1 | 6.89 | 0.02 | Residue had a slimy feel to it, strong odor, material thickened |
|  |  |  |  | 2 | 2.9 | 0.09 | Slimy, strong odor, material thickened |
|  |  |  |  | Av. | 4.895 | 0.46 |  |
| RC6 | 80% | A-1 | 20% |  | Material became thick and clumpy, was unable to spray | | |
| RC7 | 80% | A-33 | 20% | 1 | 1.58 | 0 | Slimy residue, was difficult to spray evenly, material thickened |
|  |  |  |  | 2 | 1.71 | 0.65 |  |
|  |  |  |  | Av. | 1.645 | 0.325 |  |
| RC8 | 80% | Carbamide | 20% | 1 | 1.32 | 0.04 |  |
|  |  |  |  | 2 | 1.24 | 0 |  |
|  |  |  |  | Av. | 1.28 | 0.02 |  |

The steps of the experiment were as follows:
1) Prepare the following mold release mixtures in cups as noted in Table 3:

TABLE 3

Mold Release Mixtures

| Name | Catalyst ID | Mass (g) | PC-80 RC (g) |
|---|---|---|---|
| RC |  | 0 | 100 |
| RC1 | ZF-10 | 2 | 98 |
| RC2 | A-1 | 2 | 98 |
| RC3 | A-33 | 2 | 98 |
| RC4 | Carbamide | 2 | 98 |
| RC5 | ZF-10 | 20 | 80 |
| RC6 | A-1 | 20 | 80 |
| RC7 | A-33 | 20 | 80 |
| RC8 | Carbamide | 20 | 80 |

2) Place the plate on the silicone heater with thermocouple and bring its surface temperature to 135° F. (57.2° C.), confirming with a K-type temperature probe.
3) Mix the B side together in a cup and set aside.
4) Fold a 10"×10" (25.4 cm×25.4 cm) cardboard box, placing the silicone heater and plate inside this box and measuring the plate temperature with a surface thermocouple probe. This combination will henceforth be referred to as the "pour box".
5) Place the pour box onto a scale and tare this weight to zero.
6) Coat the plate evenly with RC until 0.8 g of material have been applied, taking care not to spray any onto the walls of the box.
7) Place the pour box onto a flat tabletop. Place a 10"×10" (25.4 cm×25.4 cm). Start a countdown timer for 4 minutes.
8) After 3 minutes, record the temperature on the surface of the plate using a temperature probe.
9) After another 30 seconds (3 minutes 30 seconds elapsed), begin mixing together the A and B side. Continue mixing for the remaining 30 seconds.
10) Pour the foam onto the plate and allow to rise for 3 minutes.
11) Remove the foam from the plate by firmly gripping two adjacent corners and peeling back the foam over the course of about 3 seconds.
12) Weigh the plate with any residue still in place, scrape off any residue, weigh the plate again and record the difference between these two weights.
13) Repeat the steps 2-12 twice for all release coatings outlined in step 1. The results of this experiment are shown and analyzed in Table 2 and FIGS. 12-15, respectively.

Discussion of Results

In the following discussion sections, the results of Examples 1 and 2 are discussed, which compares the differences between the "standard release coating" and "mold release mixture".

Figure 6:
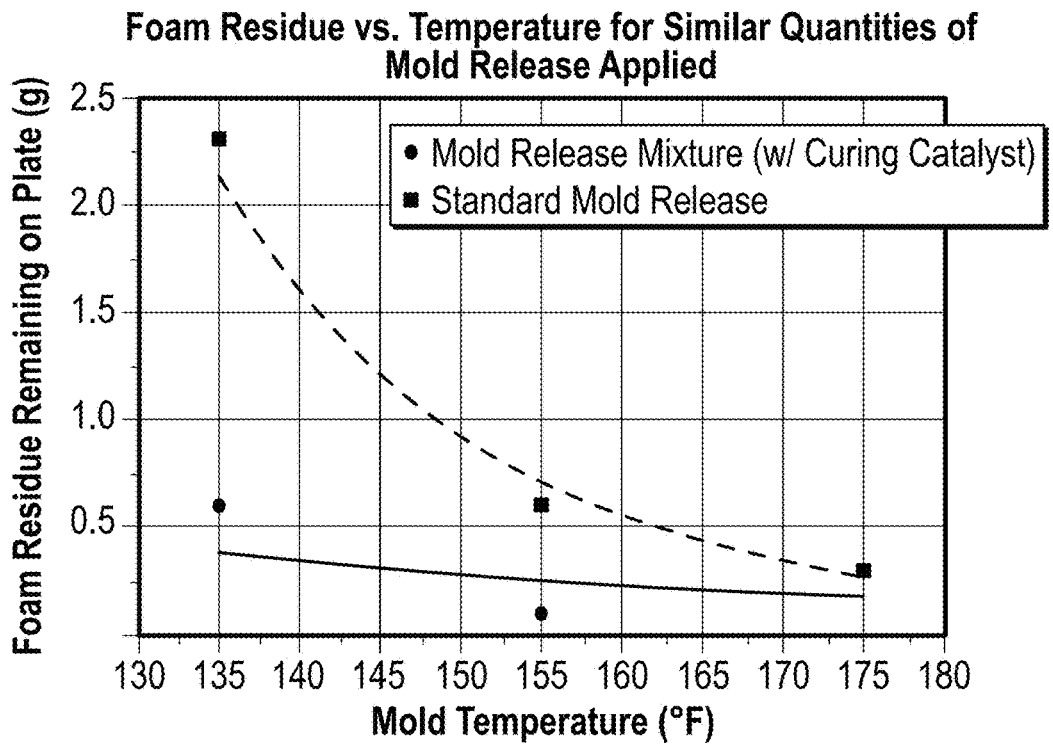
FIG. 6 is a chart depicting the amount of residual foam left on a plate versus temperature as described in Example 1, for similar quantities applied of each of the standard, release and the mold release mixture with 20% by weight curing catalyst.

FIG. 6 shows the residual foam left on a plate coated by the standard release coating and the mold release mixture, at three different temperatures with similar masses of material used.

Figure 7:
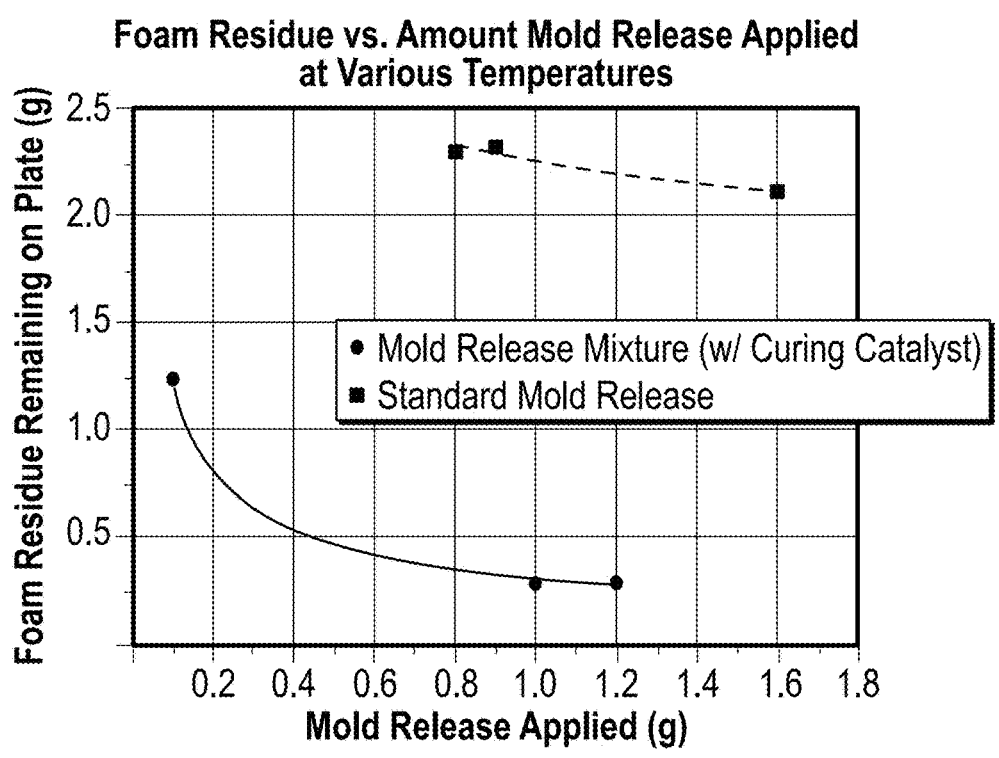
FIG. 7 is a chart depicting the amount of residual foam left on plates at 135° F. (57° C.), which have been sprayed as described in Example 1.

FIG. 7 shows the average amount of residual foam left on the plate by the standard release coating and the mold release mixture, where the mold surface temperature was 135° F. (57° C.) as the quantity of mold release is varied.

Figure 8:
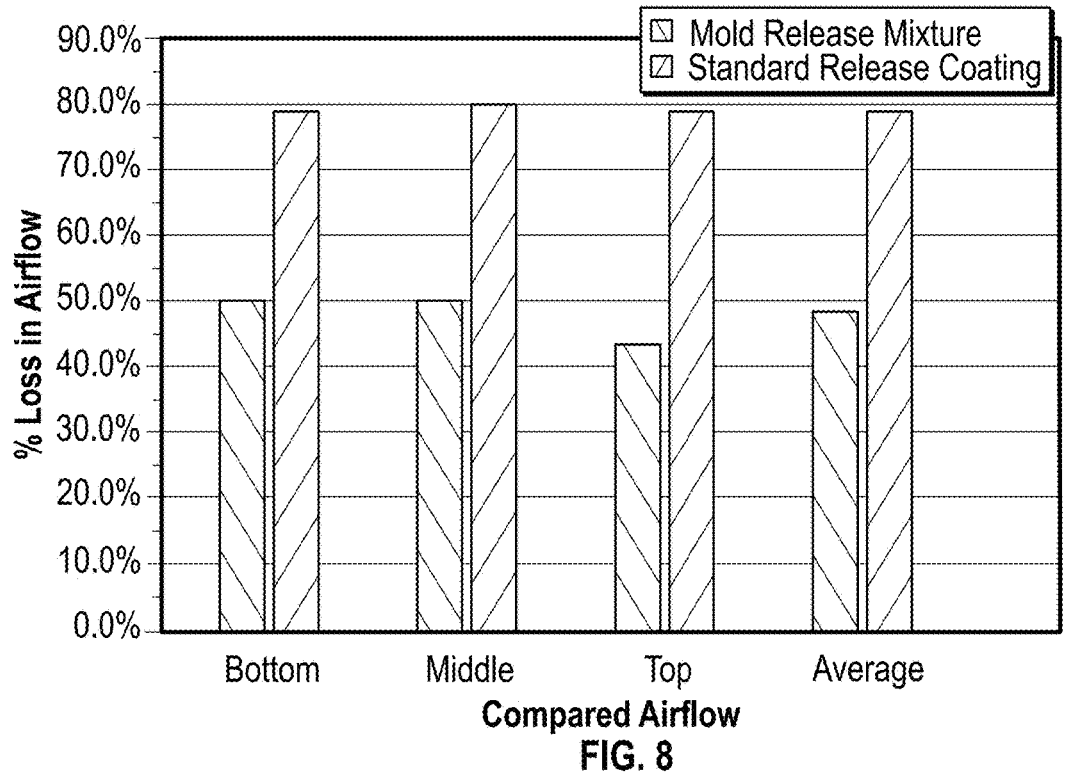
FIGS. 8 and 9 are charts depicting the loss in airflow at two different temperatures on the bottom surface of the foams, as compared to the airflow taken from the bottom, middle, and top of these foams, as well as to the average of these three values.

FIG. 8 shows the % loss in airflow on the bottom skin of each foam as compared to a sample taken from the bottom, middle, and top, as well as the average of these three values. This is shown for at 155° F. (68° C.) for both the standard release coating and mold release mixture.

Figure 9:
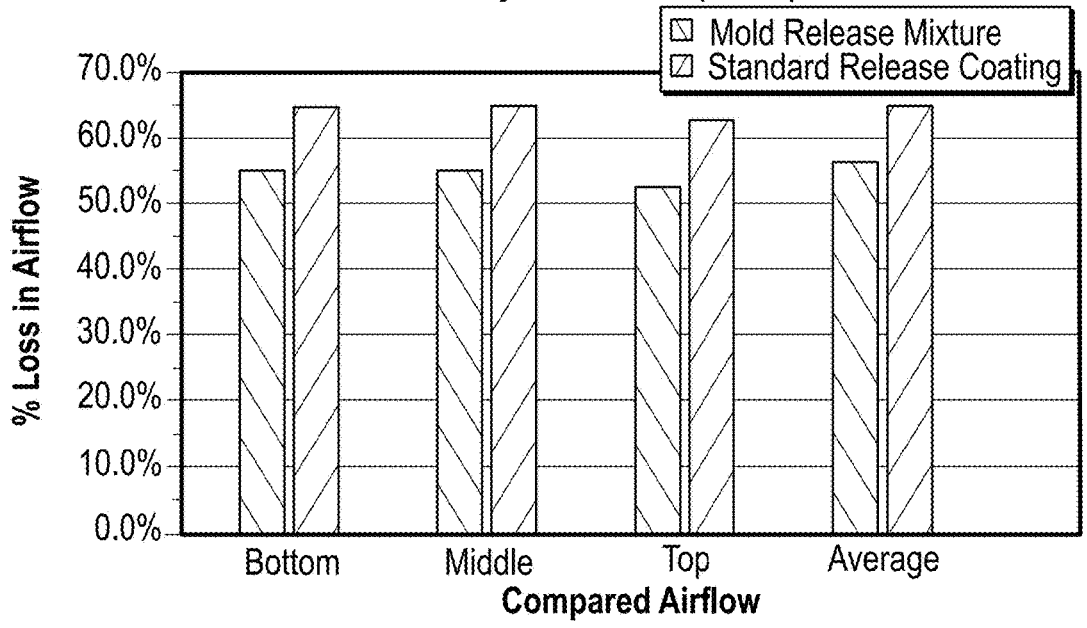

FIG. 9 shows the % loss in airflow on the bottom skin of each foam as compared to a sample taken from the bottom, middle, and top, as well as the average of these three values. This is shown for at 175° F. (97° C.) for both the standard release coating and mold release mixture.

FIG. 10 shows the change in volatile mass over time, for the mold release mixture at various temperatures as determined by a Karl Fischer Machine.

FIG. 11 shows the change in volatile mass over time, for the standard release coating at various temperatures as determined by a Karl Fischer Machine.

Figure 12:
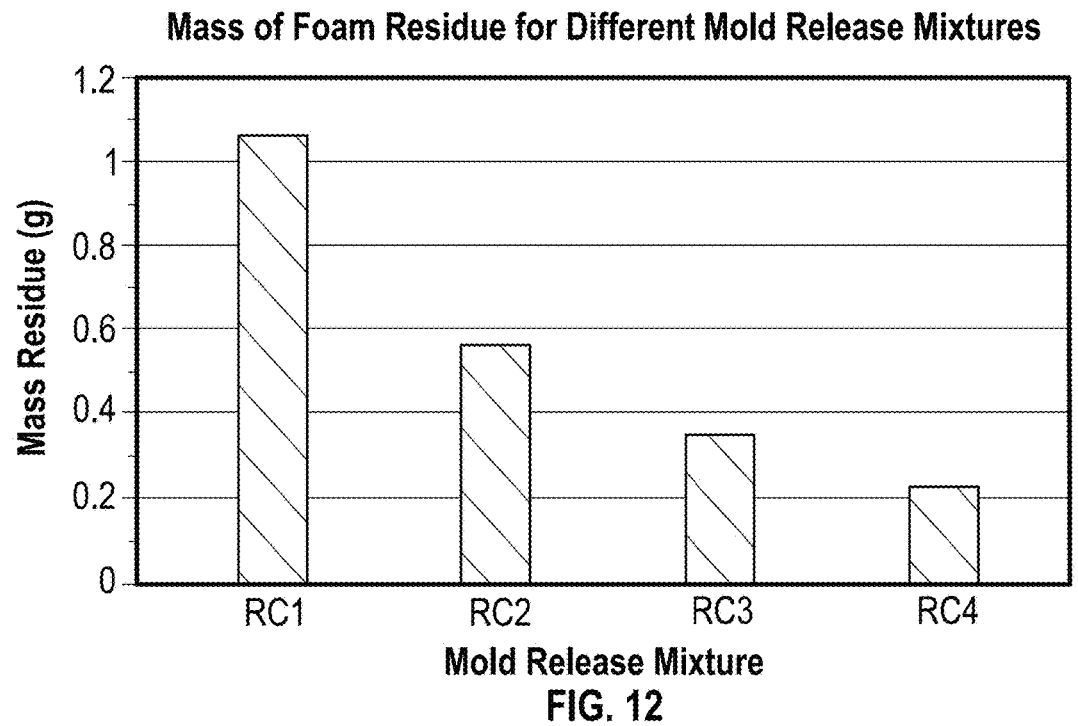
FIG. 12 is a chart showing the mass of foam residue remaining on the plate following the application of release coatings RC1, RC2, RC3, and RC4 in Example 3.

FIG. 12 shows the mass of foam residue remaining on the plate following the application of release coatings RC1, RC2, RC3, and RC4 in Example 3.

Figure 13:
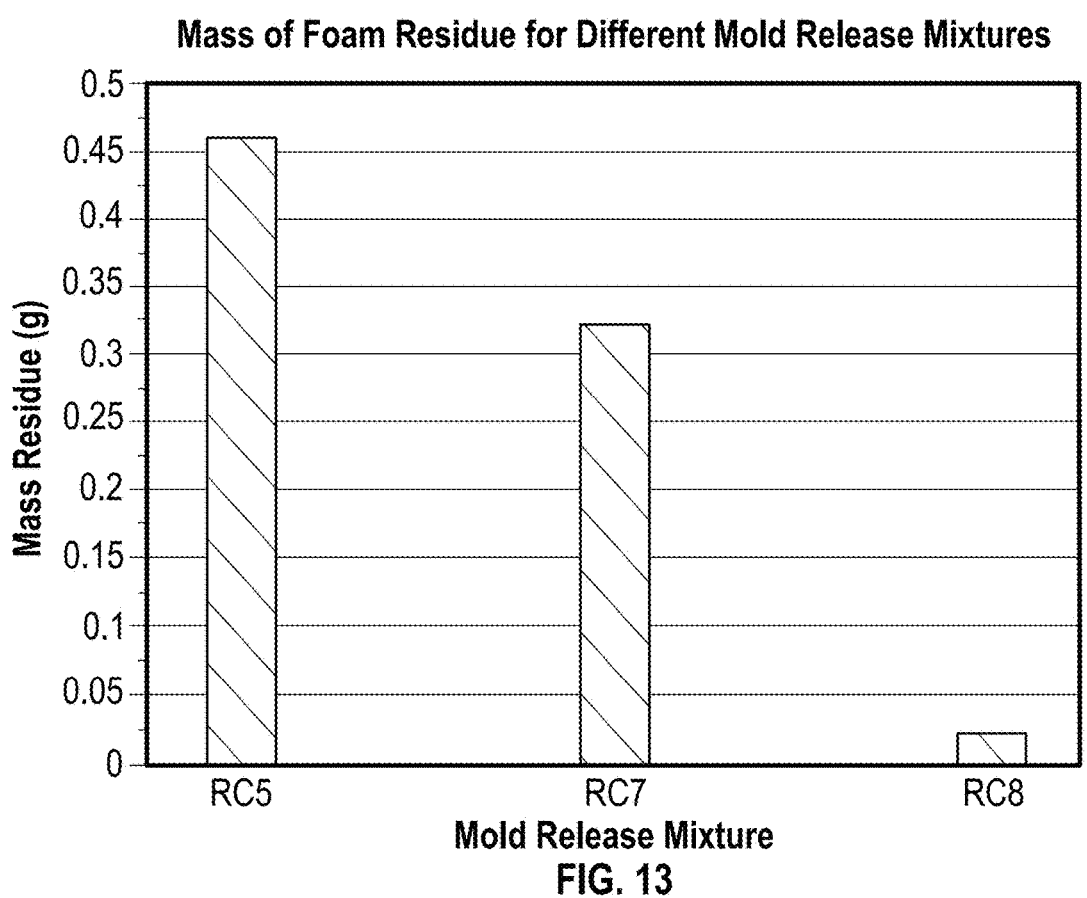
FIG. 13 is a chart showing the mass of foam residue remaining on the plate following the application of release coatings RC5, RC7, and RC8 in Example 3.

FIG. 13 shows the mass of foam residue remaining on the plate following the application of release coatings RC5, RC7, and RC8 in Example 3.

Figure 14:
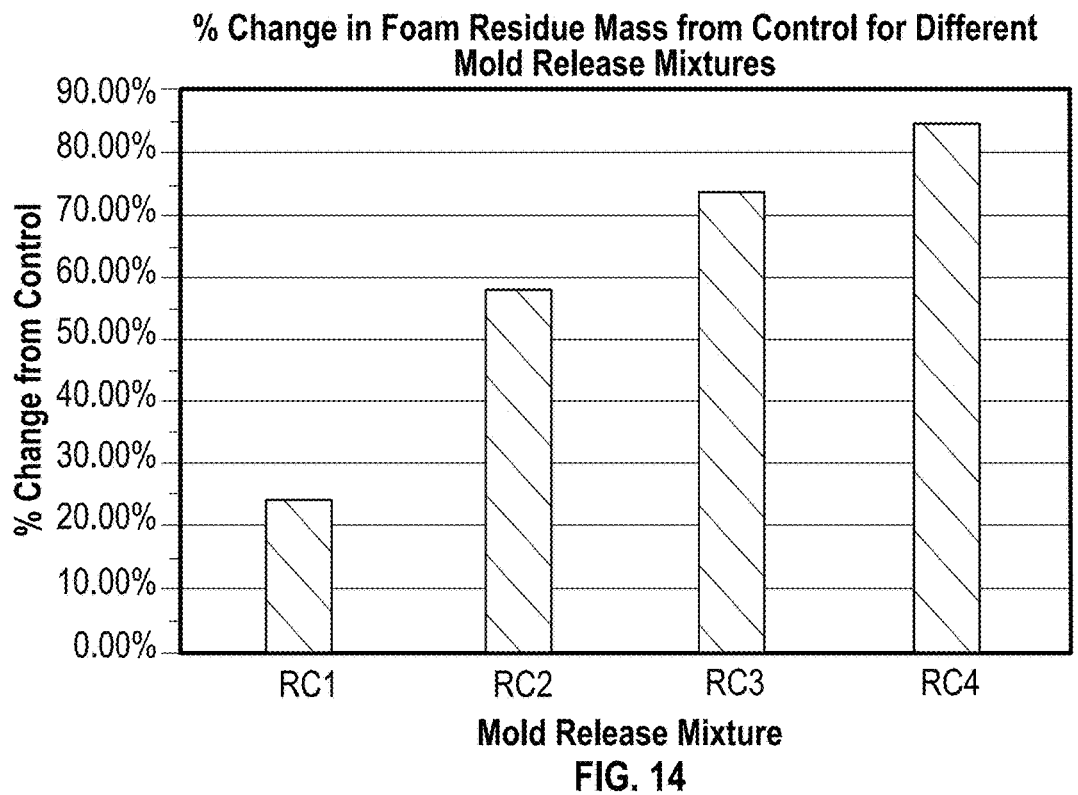
FIG. 14 is a chart showing the % change in mass residue remaining on the plate following the application of release coatings RC1, RC2, RC3, and RC4, as compared to the mass residue remaining on the plate following the application of the standard release coating (control) in Example 3.

FIG. 14 shows the % change in mass residue remaining on the plate following the application of release coatings RC1, RC2, RC3, and RC4, as compared to the mass residue remaining on the plate following the application of the standard release coating (control) in Example 3.

Figure 15:
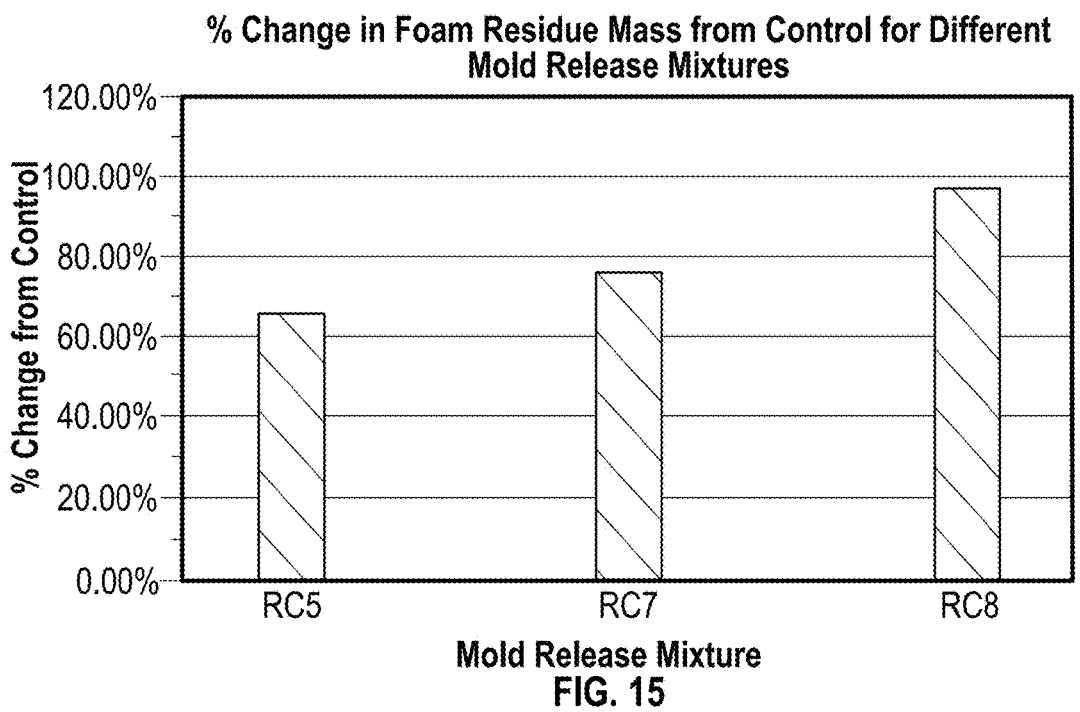
FIG. 15 is a chart showing the % change in mass residue remaining on the plate following the application of release coatings RC5, RC7, and RC8, as compared to the mass residue remaining on the plate following the application of the standard release coating (control) in Example 3.

FIG. 15 shows the % change in mass residue remaining on the plate following the application of release coatings RC5, RC7, and RC8, as compared to the mass residue remaining on the plate following the application of the standard release coating (control) in Example 3.

Table 1 gives a summary of the data used to generate FIG. 6-11. From FIG. 6, it can be seen that, at any of the three temperatures tested, there is less residue of foam remaining on the mold surface when the mold release mixture is used, as compared to the same surface with the standard release coating, when each mold release is added at similar quantities. Here, it is shown that the mold release mixture maintains a consistently low level of delamination across all three temperatures, which the standard release coating only approaches at the highest temperature. It does so asymptotically, indicating that this may be a baseline level of delamination achieved by either mold release across all tested conditions. FIG. 8 highlights the difference in foam delamination on each plate onto which the mold release mixture and standard release coating have been sprayed, respectively, at the lower of the three temperatures (135° F. (57° C.)) for various quantities of mold release applied. This indicates that the improvement in demolding is consistent across a range of application amounts in this temperature range. FIGS. 8 and 9 show the effect of the mold release mixture and standard release coating on the airflow of the skin of foams by comparing the percent loss in airflow from that of samples taken from the bottom, middle, and top of each foam, as well as the average of these three values. FIG. 8 compares foams poured onto plates at 155° F. (68° C.) that have been coated with mold release mixture and standard release coating, respectively, while FIG. 9 shows the same comparison for plates at 175° F. (97° C.). These temperatures are highlighted in preference of the lower temperature, because in the latter case, delamination was significant enough with the standard release coating that the lack of surface skin skewed the results. In both figures, it can be observed that mold release mixture shows significantly lower loss in airflow, indicating that the release coating is improving the surface airflow over that achieved with standard release coatings. FIGS. 10 and 11 show the rate and degree to which the two mold releases dry on the surface of the mold at various temperatures. These times are comparable, showing that the addition of catalyst would not have a negative impact on processing and drying times during production.

Table 2 gives a summary of the results of Example 3, which were used to generate FIGS. 12-15. From FIGS. 12 and 13, it can be seen that the choice in amine catalyst has an impact on the ability of the foam to demold from the plate, evinced by the amount of foam residue remaining on the plate. All of the catalysts used in FIG. 12 had 2% by weight of each of the catalysts used, while those in FIG. 13 had 20% by weight of each catalyst used. A comparison of the results from these two values shows a clear improvement in demolding ability of the foam as the % weight of any individual catalyst is increased as well. FIGS. 14 and 15 compare the amount of foam residue remaining on the plate after the application of each mold release mixture with the foam residue remaining after the application of the standard mold release, measured as % change. Here, the higher the value, the greater improvement in demolding ability that was shown with the addition of catalyst. In all cases, it can be seen that the addition of the catalysts used at both levels shows a clear advantage in demolding ability of the foam, with certain catalysts clearly performing better than others at the same levels. Again, by comparing the results of these two values, it can be seen that increasing the quantity of catalyst shows an improvement in demolding ability of the foam. In the cases of FIGS. 14 and 15, it should be noted that RC6 was not included, as the mixture proved impossible to spray, so no meaningful results could be determined.

Many modifications may be made in the methods of and implementation of this invention without departing from the scope thereof that are defined only in the appended claims. Accordingly, the specification is to be regarded in an illustrative rather than a restrictive sense. For example, different barrier release coatings, curing catalysts, emulsifiers, and solvents may be used in the mold release mixtures and in different proportions than those described and/or exemplified. Further, mixing procedures, procedures for applying the barrier release coatings and/or curing catalysts may be different than those exemplified or described and still be within the claimed methods and compositions.

The words "comprising" and "comprises" as used throughout the claims is interpreted "including but not limited to".

The present invention may suitably comprise, consist or consist essentially of the elements disclosed and may be practiced in the absence of an element not disclosed. In one non-limiting embodiment there may be provided a mold release mixture consisting essentially of or consisting of a barrier release coating and a curing catalyst, where the mold release mixture prevents adherence of polyurethane reactants to a mold surface that was coated with the mold release mixture prior to addition of polyurethane reactants to the mold.

There may be further provided in another non-restrictive version a method of applying a mold release mixture to a mold consisting essentially of or consisting of initially coating the mold with a first mold release mixture comprising a concentration of between about 0.1 to about 100% by weight of barrier release coating, followed by the application of a second mold release mixture comprising a concentration of between about 0.1 to about 98% by weight of curing catalyst.

There may be additionally provided in another non-limiting embodiment a method of producing polyurethane articles consisting essentially of or consisting of coating the surface of a mold with a mold release mixture comprising a barrier release coating and a curing catalyst, drying the mold release mixture on the mold surface, introducing polyurethane reactants to the mold, removing a polyurethane article from the mold, and recoating the mold surface with mold release mixture.

In another non-restrictive version there may be provided a method of producing polyurethane articles consisting essentially of or consisting of coating the surface of a mold with a mold release mixture comprising a barrier release coating and 0% to 99.9% by weight of a curing catalyst, drying the mold release mixture on the mold surface, introducing polyurethane reactants to the mold, removing a polyurethane article from the mold, and recoating the mold surface with mold release mixture.

What is claimed is:

1. A method of producing polyurethane articles comprising:
   coating a surface of a mold with a mold release mixture comprising a barrier release coating, a solvent that is water, and 0.01% to 99.9% by weight of a curing catalyst, where the curing catalyst is selected from the group consisting of amides; carbamide; a metal catalyst comprising soaps, alcoholates or salts of metals having the formula:

$Me(OR')_m X_{n-m}$ where Me is a metal having an atomic number in the range of 21 to 83, R' is selected from the group consisting of aliphatic, cycloaliphatic, and aryl hydrocarbon radicals containing at least six carbon atoms, n is the valence of the metal Me selected and is at least 3, X is an organic carboxylic acid radical and m is a positive integer selected from the range of 0 to the valence of the metal Me, such that the metal catalyst catalyzes the chemical reaction between polyisocyanate and polyester with accompanying foaming of said composition, and combinations thereof;

coating the surface of the mold with a curing catalyst mixture comprising a curing catalyst;
drying the mold release mixture on the mold surface;
drying the curing catalyst mixture on the mold surface;
introducing polyurethane reactants to the mold;
removing a polyurethane article from the mold; and
recoating the mold surface with mold release mixture.

2. The method of claim 1 where the barrier release coating is in the range of about 0.1 to about 98% by weight of the mold release mixture.

3. The method of claim 1 where the barrier release coating is selected from the group consisting of lubricating oils, solid lubricants, waxes, lipids, esters of fatty acids, polyalphaolefins, polysiloxanes, and combinations thereof.

4. The method of claim 1, where the curing catalyst is an amide, defined here as an organic compound, R, containing the group —C(O)NH$_2$, where the R group is either a hydrogen atom or a collection of bonded molecules, at least one of which is carbon and serves as the bonding site for other attached groups in the overall compound.

5. The method of claim 4 where the curing catalyst is carbamide.

6. The method of claim 1 additionally comprising an organic solvent with a boiling point of less than 200° C. at 760 mmHg.

7. The method of claim 1 additionally comprising a semi-volatile organic solvent with a boiling point of between about 200° C. to about 500° C. at 760 mmHg.

8. The method of claim 1 where the mold release mixture comprises a liquid, solid, or paste at 25° C. and 760 mmHg.

9. The method of claim 1 additionally comprising an emulsifier capable of producing an emulsion of some or all of the barrier release coating and the curing catalyst of the mold release mixture.

10. The method of claim 9, where the emulsifier has a HLB value from about 4 to about 20.

11. A method of producing polyurethane articles comprising:
coating a surface of a mold with a mold release mixture comprising a barrier release coating and 0.01% to 99.9% by weight of a curing catalyst, where the curing catalyst is an amide, defined here as an organic compound, R, containing the group —C(O)NH$_2$, where the R group is either a hydrogen atom or a collection of bonded molecules, at least one of which is carbon and serves as the bonding site for other attached groups in the overall compound;
coating the surface of the mold with a curing catalyst mixture comprising a curing catalyst;
drying the mold release mixture on the mold surface;
drying the curing catalyst mixture on the mold surface;
introducing polyurethane reactants to the mold;
removing a polyurethane article from the mold; and
recoating the mold surface with mold release mixture.

12. The method of claim 11 where the barrier release coating is in the range of about 0.1 to about 98% by weight of the mold release mixture.

13. The method of claim 11 where the barrier release coating is selected from the group consisting of lubricating oils, solid lubricants, waxes, lipids, esters of fatty acids, polyalphaolefins, polysiloxanes, and combinations thereof.

14. The method of claim 11 where the curing catalyst is carbamide.

15. The method of claim 11 additionally comprising a solvent that is water.

16. The method of claim 11 additionally comprising an organic solvent with a boiling point of less than 200° C. at 760 mmHg.

17. The method of claim 11 additionally comprising a semi-volatile organic solvent with a boiling point of between about 200° C. to about 500° C. at 760 mmHg.

18. The method of claim 11 where the mold release mixture comprises a liquid, solid, or paste at 25° C. and 760 mmHg.

19. The method of claim 11 additionally comprising an emulsifier capable of producing an emulsion of some or all of the barrier release coating and the curing catalyst of the mold release mixture.

20. The method of claim 19, where the emulsifier has a HLB value from about 4 to about 20.

* * * * *